US012045348B2

(12) United States Patent
Gutierrez et al.

(10) Patent No.: US 12,045,348 B2
(45) Date of Patent: *Jul. 23, 2024

(54) METHODS AND ARRANGEMENTS FOR MULTI-LAYER IN-VEHICLE NETWORK INTRUSION DETECTION AND CHARACTERIZATION

(71) Applicant: INTEL CORPORATION, Santa Clara, CA (US)

(72) Inventors: Christopher N. Gutierrez, Hillsboro, OR (US); Marcio Juliato, Portland, OR (US); Shabbir Ahmed, Beaverton, OR (US); Qian Wang, Portland, OR (US); Manoj Sastry, Portland, OR (US); Liuyang L Yang, Portland, OR (US); Xiruo Liu, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 17/867,780

(22) Filed: Jul. 19, 2022

(65) Prior Publication Data

US 2022/0350888 A1 Nov. 3, 2022

Related U.S. Application Data

(63) Continuation of application No. 16/727,565, filed on Dec. 26, 2019, now Pat. No. 11,423,145.

(51) Int. Cl.
*G06F 21/56* (2013.01)

(52) U.S. Cl.
CPC ...... *G06F 21/566* (2013.01); *G06F 2221/034* (2013.01)

(58) Field of Classification Search
CPC .................................................... G06F 21/566
See application file for complete search history.

(56) References Cited

U.S. PATENT DOCUMENTS

| 9,845,050 B1* | 12/2017 | Garza | G08B 21/0205 |
| 2018/0086336 A1* | 3/2018 | Jones | B60W 50/02 |
| 2018/0091550 A1* | 3/2018 | Cho | H04L 5/0055 |
| 2019/0213290 A1* | 7/2019 | Delva | B60W 50/00 |

* cited by examiner

*Primary Examiner* — Nelson S. Giddins
*Assistant Examiner* — Shu Chun Gao
(74) *Attorney, Agent, or Firm* — KDW Firm PLLC

(57) ABSTRACT

Logic may implement observation layer intrusion detection systems (IDSs) to combine observations by intrusion detectors and/or other intrusion detection systems. Logic may monitor one or more control units at one or more observation layers of an in-vehicle network, each of the one or more control units to perform a vehicle function. Logic may combine observations of the one or more control units at the one or more observation layers. Logic may determine, based on a combination of the observations, that one or more of the observations represent an intrusion. Logic may determine, based at least on the observations, characteristics of an attack, and to pass the characteristics of the attack information to a forensic logging system to log the attack or pass the characteristics of the attack to a recovery system for informed selection of recovery procedures. Logic may dynamically adjust a threshold for detection of suspicious activity.

20 Claims, 20 Drawing Sheets

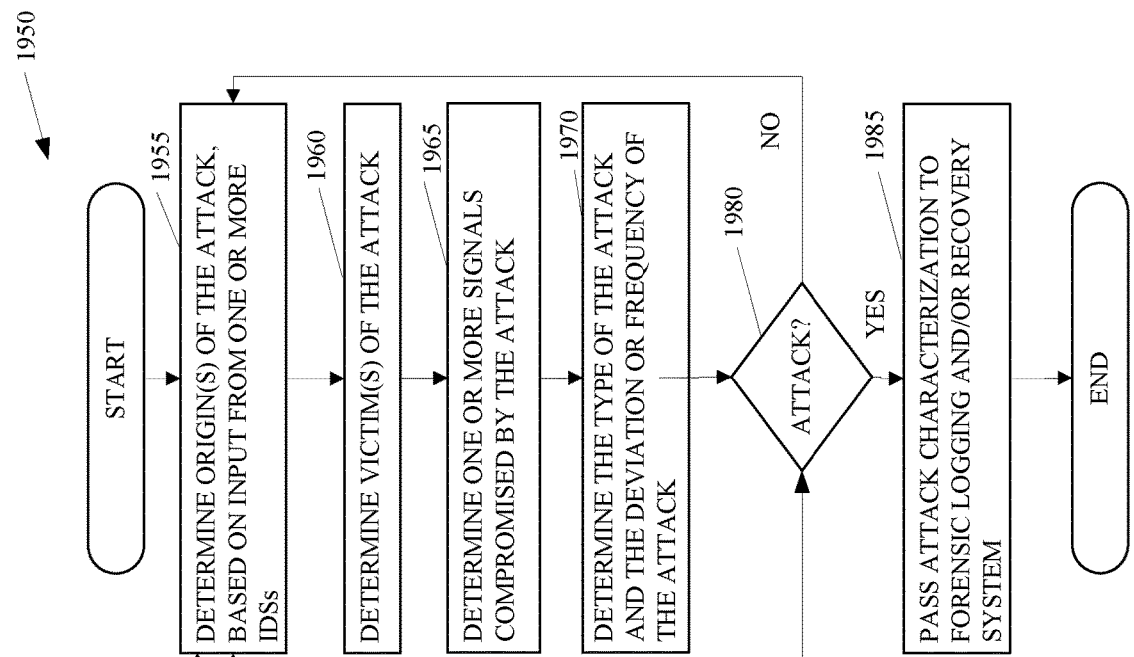
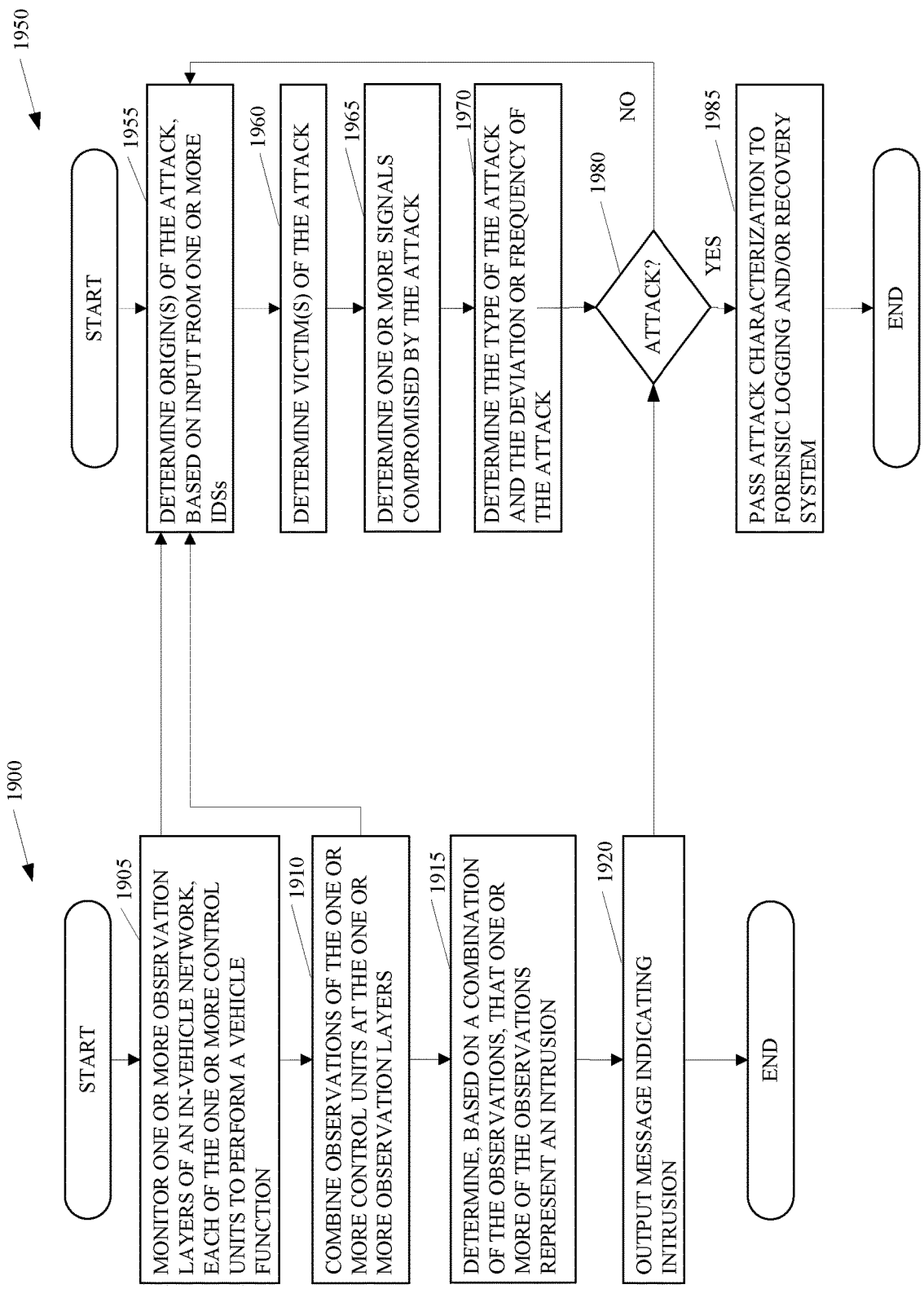

METHODS AND ARRANGEMENTS FOR MULTI-LAYER IN-VEHICLE NETWORK INTRUSION DETECTION AND CHARACTERIZATION

CROSS-REFERENCE TO RELATED APPLICATIONS

This application is a continuation of, claims the benefit of and priority to previously filed U.S. patent application Ser. No. 16/727,565 filed Dec. 26, 2019, entitled "METHODS AND ARRANGEMENTS FOR MULTI-LAYER IN-VEHICLE NETWORK INTRUSION DETECTION AND CHARACTERIZATION", which is hereby incorporated by reference in its entirety.

TECHNICAL FIELD

Embodiments are in the field of in-vehicle network security systems. More particularly, embodiments may implement combined layer and/or multi-layer intrusion detection and may include attacker characterization.

BACKGROUND

Automotive systems have become increasingly computerized in recent years. Driving systems rely on correct and robust operation of underlying controls. Many modern vehicles include numerous different electronic control units (ECUs), including some ECUs that are very important for safety. For instance, the ECUs in an autonomous or semi-autonomous vehicle may include an engine control module (ECM), a transmission control module (TCM), a steering control module (SCM), a brake control module (BCM), a global positioning system (GPS) module (GPSM), a vision control module (VCM), a heading control module (HCM), an in-vehicle infotainment unit (IVIU), etc. The ECUs in a vehicle may be referred to collectively as a vehicle control system (VCS).

An ECU may include a processor and software that executes on the processor to cause that ECU to perform the desired operations or vehicle functions. Such a processor may be referred to as a microcontroller unit (MCU), and such software may be referred to as firmware.

An anomaly in the operation of an ECU, whether due to adversarial actions, malicious attacks, etc., or due to one or more failures in hardware, in software, etc., can affect critical control systems of the vehicle. If an attacker can load malicious software ("malware") into an ECU, that malware may cause the ECU to perform malicious operations which can compromise vehicle safety and be very dangerous. For example, an attacker that has compromised lateral/longitudinal control of an ECU can accelerate, brake, and steer the vehicle.

Some automotive systems include a variety of ECUs with mechanical fallback for increased reliability. In some levels of automation, however, there are no physical interfaces exposed to the driver/operator. As such, during an attack on an ECU, the driver/operator is unable to take any corrective actions. Furthermore, as automotive systems evolve from driver-assisted to fully Automated Driving Systems (ADS), previously open-loop systems controlled by the driver will become closed under governance of additional distributed controllers (e.g., longitudinal and lateral control, emergency braking, etc.). Hence, securing closed-loop control systems will become critical for ensuring safety and security.

Whether closed loop or open loop, current intrusion detectors are designed to address specific attacks. An intrusion detector may monitor for a known voltage pattern and/or known threshold behavior related to the operation of an ECU. If the ECU operates outside of the known voltage or threshold, the intrusion detectors may output an indication of the anomalous behavior even though the behavior might be temporary and relate to, e.g., an anomalous external factor.

BRIEF DESCRIPTION OF THE DRAWINGS

FIGS. 19A-B depict embodiments of flowcharts to detect intrusions and characterizes attacks based on observations about the intrusions/attacks.

DETAILED DESCRIPTION OF EMBODIMENTS

Figure 1:
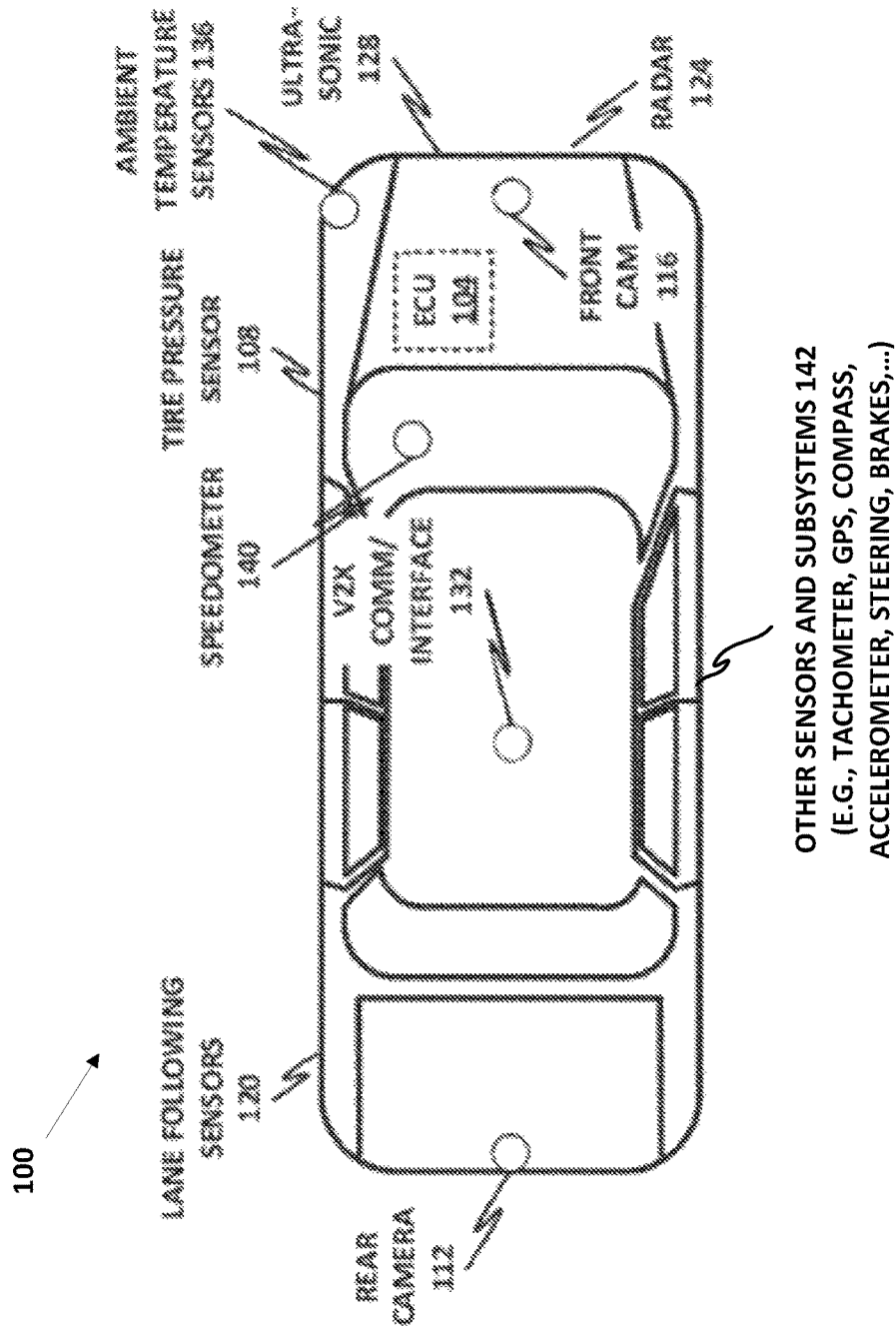
FIG. 1 depicts an embodiment of a block diagram of a motor vehicle that may host an in-vehicle network (IVN)

The following is a detailed description of embodiments depicted in the drawings. The detailed description covers all modifications, equivalents, and alternatives falling within the appended claims.

Fault-tolerant and control techniques are based on known fault-models. Such models, however, do not cover adversary models where malicious actions are unpredictable. For vehicles to remain safe for operation, the vehicles must maintain the safe operation of control systems under adversarial influences, which requires the introduction of security mechanisms to detect attacks in real time.

Embodiments may compliment the intrusion detectors by establishing one or more combined layer intrusion detection systems (IDSs) such as one or more intra-layer IDSs, one or more inter-layer IDSs, and/or one or more global IDSs. A combined layer IDS, as discussed herein, may combine information from more than one intrusion detector to advantageously, e.g., increase the confidence or reliability of detection of an intrusion, increase the accuracy of a detection of an intrusion, and/or reduce latency associated with detection of an intrusion.

Observation layers (or layers), as discussed herein, refer to a perspective of review of information available at an in-vehicle network. For instance, the observation layers may include a physical layer, a message layer, a context layer, and, in some embodiments, one or more other layers. The physical layer refers to a perspective of a transceiver output of an ECU. At the physical layer, an intrusion detector may monitor a voltage and/or timing pattern of an ECU. The ECU may output, e.g., messages to a bus of the in-vehicle network and the voltage and/or timing pattern may include, e.g., a voltage fingerprint or pattern that identifies the transmitting ECU (source ECU) for the message on the in-vehicle network.

The message layer refers to a perspective of a time series or sequence of messages transmitted on the in-vehicle network bus by ECUs, sensors, actuators, and/or other communications device. The ECUs may, for example, provide data such as engine temperature, outside temperature, inside temperature, longitudinal acceleration/deceleration, speed, inclination, and/or the like. The sensors may provide readings to the ECUs over the in-vehicle network bus, and the actuators may receive instructions from an ECU over the in-vehicle network bus to perform a physical function such as applying brakes, applying the accelerator, turn left, turn right, and/or any other vehicle function that involves a physical action.

The in-vehicle network bus may comprise any kind of bus or bus system for transmitting and receiving messages between control units (ECUs), sensors, actuators, intrusion detectors, intrusion detection systems, and possibly other components. Some examples of in-vehicle network buses include a Controller Area Network (CAN) bus, a CAN with flexible data-rate (CAN-FD) bus, a FlexRay bus, a local interconnect network (LIN) bus, an Ethernet, etc.

The context layer refers to a perspective of actions performed in the context of the vehicle state. For instance, if the state of the speed of the vehicle is 0 miles per hour, an ECU issued an instruction to accelerate the vehicle, the context layer may predict a change in the speed of the vehicle to be sensed by a speedometer cable or wheel sensors. The context layer may have specific information about the vehicle to facilitate a prediction that the speed will be, e.g., at 1 mph with a 5% margin of error upon receipt of the next message from the speedometer ECU. If the speedometer ECU transmits a message that indicates a speed of, e.g., 100 mph, the difference between the predicted speed and the observed speed (from the speedometer ECU) will likely exceed the residual threshold for the speed in the context layer and the context layer may transmit a message via the in-vehicle network and/or via another communications medium to the combined layer IDSs to indicate the suspected intrusion. For instance, some embodiments may establish a separate, secure communications medium for messages for combined layer IDSs.

Some embodiments may include one or more additional layers and may include one or more IDSs to monitor the one or more additional layers. For instance, some embodiments may treat external communications such as V2X communications as a distinct layer. Other embodiments may monitor the V2X communications via the in-vehicle network.

In some embodiments, the combined layer IDS may include an intra-layer IDS. The intra-layer IDS may monitor two or more intrusion detectors and/or IDSs on the same layer. For instance, an intra-layer IDS may monitor a voltage fingerprint IDS for a first ECU and a voltage fingerprint IDS for a second ECU in the physical layer. Furthermore, the combined layer IDS may include multiple intra-layer IDSs, each configured to monitor, e.g., a different subsystem of the vehicle. For example, one sub-system may include ECUs for windows and/or locks and a second sub-system may include ECUs for an infotainment system.

In some embodiments, the combined layer IDS may include an inter-layer IDS. The inter-layer IDS may monitor intrusion detectors and/or IDSs on two different layers. For instance, an inter-layer IDS may monitor a voltage fingerprint IDS for a first ECU on the physical layer and a message time series IDS for a second ECU on the message layer. The voltage fingerprint IDS may detect and report suspicious activity from a first ECU and the inter-layer IDS may monitor the message time series IDS on the message layer for corresponding suspicious activity on the message layer.

In some embodiments, the combined layer IDS may dynamically adjust a threshold of an IDS in a first layer based on output from IDSs on other layers. For instance, the combined layer IDS may dynamically adjust a threshold of a message layer IDS for the detection of suspicious activity at the message layer for the first ECU and/or a group of ECUs associated with the first ECU in response to detection of the suspicious activity and/or the lack of detection of suspicious activity by the fingerprint IDS at the first ECU. As an example, the threshold may reside at a first detection level during normal operation to reduce false positives but may be lowered to increase sensitivity in response to the detection of suspicious activity at the physical layer to reduce false negatives and increase the chance of detection of (or decrease the chance of failing to detect) suspicious behavior at the message layer. As an alternative example, the threshold may reside at a first detection level during normal operation but may be increased to decrease sensitivity in response to the detection of suspicious activity at the physical layer to decrease the chance of detection of a false positive at the message layer.

In some embodiments, the combined layer IDS may include a global layer IDS. The global layer IDS may monitor intrusion detectors and/or IDSs on multiple layers or all layers. The global layer IDS may also monitor intra-layer IDSs and inter-layer IDSs. For instance, a global layer IDS may monitor intrusion detectors and/or IDSs on the physical layer, the message layer, and the context layer. In some embodiments, a global layer IDS may monitor one or more subsystems coupled with the in-vehicle network. In other embodiments, the global layer IDS may monitor all subsystems connected to the in-vehicle network. In further embodiments, a first global layer IDS may monitor all subsystems and one or more other global layer IDSs may monitor one or more of the subsystems.

The combined layer IDS may combine outputs from intrusion detectors and/or IDSs in one or more different ways to determine whether suspicious activity represents an intrusion. For instance, the combined layer IDS may combine outputs from intrusion detectors and/or IDSs by a majority vote, machine learning, weighted voting, historical training, and/or the like.

A majority vote may combine outputs from intrusion detectors and/or IDSs with two or more intra-layer and/or inter-layer perspectives. For example, if a physical layer intrusion detector and/or IDS indicates suspicious activity, the combined layer IDS may count the output as a vote, determine outputs (as votes) of other intrusion detectors and/or IDSs that may detect related activity, and determine whether the suspicious activity is an intrusion based on the percentage of the votes that indicate an intrusion or attack.

Machine learning may refer to a statistical model or an artificial intelligence model trained to detect patterns of outputs from two or more intrusion detectors and/or IDSs that may detect related activity. The machine learning model may comprise a model trained via supervised training to classify activity as suspicious activity or not suspicious activity. In some embodiments, the machine learning model may provide a probability that an activity is suspicious or not. Depending on the configuration of the machine learning model, the machine learning model may receive two or more inputs from intrusion detectors and/or IDSs in the same layer and/or in more than one layers.

Weighted voting may assign weights to the outputs from intrusion detectors and/or IDSs of a selected subsystem, of a combination of two or more subsystems, and/or of all subsystems. The weights may be based on various factors such as historical reliability and/or accuracy, heuristic reliability and/or accuracy, relative reliability and/or accuracy as compared to other inputs, and/or the like. For example, for a weighted voting, the combined layer IDS may multiply the physical layer IDS output (e.g., probability) by 0.3, multiple the message layer IDS output by 0.3, and multiply the context layer IDS output by 0.4. The combined layer IDS may sum the weighted outputs (e.g., probabilities) and compare the sum of the weighted outputs to determine a combined layer weighted output. If the combined layer weighted output is greater than a threshold, e.g., 50 percent or 70 percent, the combined layer IDS may determine that the combined layer weighted output indicates that the activities detected represent an intrusion.

Historical training may refer to how current or up-to-date the training is for an intrusion detector and/or IDS. In some embodiments, the combined layer IDS may combine outputs from intrusion detectors and/or IDSs with the latest training or that have been updated within a certain period of time. In other embodiments, the combined layer IDS may assign weights to the outputs from intrusion detectors and/or IDSs based on the recency of training of the intrusion detectors and/or IDSs.

Many embodiments also include attacker characterization. The attacker characterization may involve a model such as a rules-based model and/or a machine learning model to analyze, during the attack, the outputs of multiple IDSs that include characteristics such as symptoms of the attack detected at various layers by various IDSs to ascertain an attack profile, or attack characterization. The attack characterization may include characteristics such as the origin of an attack, targets of the attacker, compromised signals, type of attack, and an attack description.

Types of attack may include, e.g., suspension attacks, flooding attacks, masquerading attacks, modification attacks, and/or the like. A suspension attack may involve a lack of messages transmitted by one or more ECUs. A flooding attack may involve transmission of over-whelming numbers of messages to prevent the timely transmission and receipt of messages via the in-vehicle network. A masquerading attack may involve one ECU transmitting messages with a source identifier (ID), or message ID, that identifies a different ECU. And a modification attack may involve, e.g., adjusting one or more values in a message from an ECU, e.g., by malicious code executing on the ECU. For instance, if the ECU for braking receives a sensor rating that indicates a first amplitude of braking, the malicious code may modify the amplitude in the message being transmitted to an actuator to accomplish the braking. The modification may increase the amplitude significantly to cause significantly more braking than expected based on the input from the braking sensor. The modification may decrease the amplitude significantly to cause significantly less braking than expected based on the input from the braking sensor. Or the modification may increase and decrease amplitudes of a sequence of braking messages to cause erratic behavior by the braking system.

The origin of the attack may identify one or more ECUs that are performing an attack. For instance, firmware of the origin ECU(s) may include malicious code and messages transmitted (and/or a lack thereof) may cause target ECU(s) to transmit erroneous signals or not to transmit predicted signals. Depending on the nature of the attack, one or more of the origin ECUs may also be target ECUs.

The compromised signals may include, e.g., unexpected or disproportionate acceleration, braking, and/or steering. The compromised signals may affect any one or more of various subsystems such as power locks, windows, turn signals, headlights, infotainment system, gauges, climate control, and/or the like.

The attack description may include additional information or characteristics of the attack such as the frequency of messages transmitted by the attacker, the percent of the modifications made by an attacker, the deviation between predicted behavior and observed behavior, and/or the like.

In further embodiments, the attack characterization may also provide a basis for updating or refining detection thresholds for one or more IDSs.

While some of the specific embodiments described below will reference the embodiments with specific configurations, those of skill in the art will realize that embodiments of the present disclosure may advantageously be implemented with other configurations with similar issues or problems.

Various embodiments may be designed to address different technical problems associated with intrusion detection and attack characterization. Other technical problems may include implementation of systems to monitor one or more control units at one or more observation layers of an in-vehicle network, each of the one or more control units to perform a vehicle function; to combine observations of the one or more control units at the one or more observation layers; and to determine, based on a combination of the observations, that one or more of the observations represent an intrusion; and/or the like. Additional technical problems relate to implementation of systems to determine, based at least on the observations, characteristics of an attack, and to inform a forensic logging and/or recovery system of the characteristics for logging intrusions/anomalies and/or for informed selection of recovery procedures. In further embodiments, detection of attacks when the attacks are designed to avoid detection thresholds, or other detection indicators, monitored by detection systems.

Different technical problems such as those discussed above may be addressed by one or more different embodiments. For instance, some embodiments that address problems associated with intrusion detection may do so by one or more different technical means, such as, memory and detection logic circuitry to monitor one or more control units at one or more observation layers of an in-vehicle network, each of the one or more control units to perform a vehicle function; to combine observations of the one or more control units at the one or more observation layers; and to determine, based on a combination of the observations, that one or more of the observations represent an intrusion; and/or the like. Some embodiments implement attack characterization logic circuitry to determine, based at least on the observations, characteristics of an attack, and to pass the characteristics of the attack information to a forensic logging and/or recovery system for logging anomalies and/or for informed selection of recovery procedures. In further embodiments, the detection logic circuitry to comprise dynamic threshold logic circuitry to dynamically adjust a threshold for detection of suspicious activity by an IDS at a first layer based on an output from an IDS at a second layer. In still further embodiments, the detection logic circuitry to comprise dynamic threshold logic circuitry to dynamically adjust a threshold for detection of suspicious activity by an IDS at a first layer based on a single output or a combination of outputs from at least one other IDS.

Several embodiments comprise systems with multiple processor cores such as distributed processing systems, access points, and/or stations (STAs), sensors, meters, controls, instruments, monitors, Internet of Things (IoT) gear (watches, glasses, headphones, and the like), and the like for in-vehicle networks, V2X networks, V2V networks, V2I networks, V2P networks, V2D networks, and/or the like. In various embodiments, these devices relate to specific applications such as vehicle applications (automobiles, self-driving vehicles, other types of vehicles, and the like), and the like.

FIG. 1 depicts a block diagram of a motor vehicle 100 that may host an in-vehicle network (IVN). Examples of in-vehicle network (IVN) buses include a control area network (CAN), a CAN with flexible data-rate (CAN-FD) bus, a FlexRay bus, a local interconnect network (LIN) bus, an Ethernet, etc. A contemporary motor vehicle 100 may include a complex network of controllers, sensors, inputs, and other data systems that may need to communicate with each other to ensure optimal operation of the vehicle. This can become a particularly complex problem in so-called smart cars, wherein the vehicle not only provides information to the end user or operator of the vehicle, but also takes control of some or all functions of the vehicle, either in certain limited circumstances, or in the case of self-driving cars, wholly autonomously.

A modern vehicle may include not only the electronic control unit (ECU) 104 that has been found in modern vehicles for decades, but may also include ECUs associated with sensors, computer vision systems, detectors, infotainment systems, and vehicle-to-everything (V2X) communication (i.e., vehicle-to-vehicle or vehicle-to-infrastructure communication systems, meaning that the vehicle may communicate not only with its own subsystems, but also with outside systems such as other vehicles, traffic information, weather information, and similar).

The introduction of V2X into the vehicle network provides a substantial new attack vector for malicious actors. Whereas before, the vehicle was a completely self-contained network with little or no outside network access, the introduction of V2X means that malicious actors now have an ingress interface into many vehicle networks. This provides attackers the opportunity to introduce malicious payloads such as injection or spoofing attacks, whereas before such attacks would have been nearly impossible without physically compromising a component within the vehicle itself.

The IVN buses arose in response to the demand for a vehicle's subsystems to be able to communicate with one another. One of the early IVNs includes the CAN bus. The CAN bus is defined by a robust standard that allows various devices to communicate with one another, particularly in environments that may lack a centralized host computer or other central controller unit. The CAN bus may operate on a multi-master serial monitor, wherein each device is known as a node. A node may be anything from a simple sensor with a single periodic output to a highly complex embedded computer (ECU) running sophisticated software. Modern automobiles may have as many as 70 electronic control units (ECU) for various subsystems.

The CAN bus is defined by the International Organization for Standardization's ISO 11898-2 specification, which defines a high-speed CAN bus unit using a linear bus terminated at each end with 120-ohm resistors. The CAN bus uses a differential signaling model, in which its physical implementation includes two wires named CANH and CANL. Whenever the node drives a "low," CANH and CANL respectively assume 3.5V and 1.5V signals, which are known as "dominant" signals. Whenever the node drives a "high," CANH and CANL both assume a 1.5V signal, which is known as "recessive." The termination resistor passively returns the two wires to a nominal differential voltage of 1.5 volts when not being driven.

To improve the safety and security of an in-vehicle network, it is advantageous to introduce an intrusion detection system (IDS) that can automatically inspect the bus and detect anomalies. It is possible to base such an IDS on voltage fingerprinting, message frequency, control, and/or other observation layer IDSs.

When an attacker performs, for example, a spoofing attack (e.g., masquerade attack, modification attack, etc.) such as changing the engine rotation or gear values, or an injection attack such as inserting fake messages (e.g., flooding attack), those established patterns are likely to be breached. As a result, anomalies in voltage fingerprint patterns, message time series data stream patterns, contextual message patterns, and/or the like may be taken as evidence of a potential intrusion.

Vehicle 100 may include a number of units that can become nodes of an IVN. For example, vehicle 100 may include a main electronic control unit (ECU) 104, which may be similar to the ECUs that are commonly used in cars to control things such as air fuel mixtures, acceleration, fuel injection, and similar functions. In some embodiments, a common ECU may not directly control the speed or direction of the car but may process a number of signals responsive to the user's inputs such as an electronic steering control, braking, acceleration, and similar. In some embodiments, the vehicle 100 may include a V2X interface 132 configured to perform communications such as vehicle-to-vehicle and vehicle-to-infrastructure communications.

The vehicle 100 may also include a number of other sensors and processors, and the number and type of these may be related to the type of vehicle. For example, a low-end, inexpensive vehicle may have only a small number of sensors, while a vehicle with electronic assist functions may have a much larger set of functions, and an autonomous, self-driving vehicle may have an even larger set of functions to support the self-driving feature. By way of illustrative and nonlimiting example, vehicle 100 may include a speedometer 140, tire pressure sensors 108, an ultrasonic sensor 128, a radar 124, a front camera 116, a rear camera 112, lane following sensors 120, and ambient temperature sensors 136. Other sensors and subsystems 142 may include, by way of nonlimiting example, a tachometer, a compass, a GPS, an accelerometer, an automatic braking system, an automatic traction control system, steering control subsystems, and others.

Each of these systems may communicate with one or more others of the systems. To communicate with other systems, a node on many IVN buses, such as the CAN bus, may broadcast a message to the IVN bus with a header identifying the source of the message (source or message identifier) and also optionally identifying the target of the message. Most in-vehicle networks operate in a broadcast manner, thus all of the nodes on such IVN buses including the CAN bus may receive the message, and those messages that are not the target or that do not need the message may simply discard or ignore the message.

Figure 2:
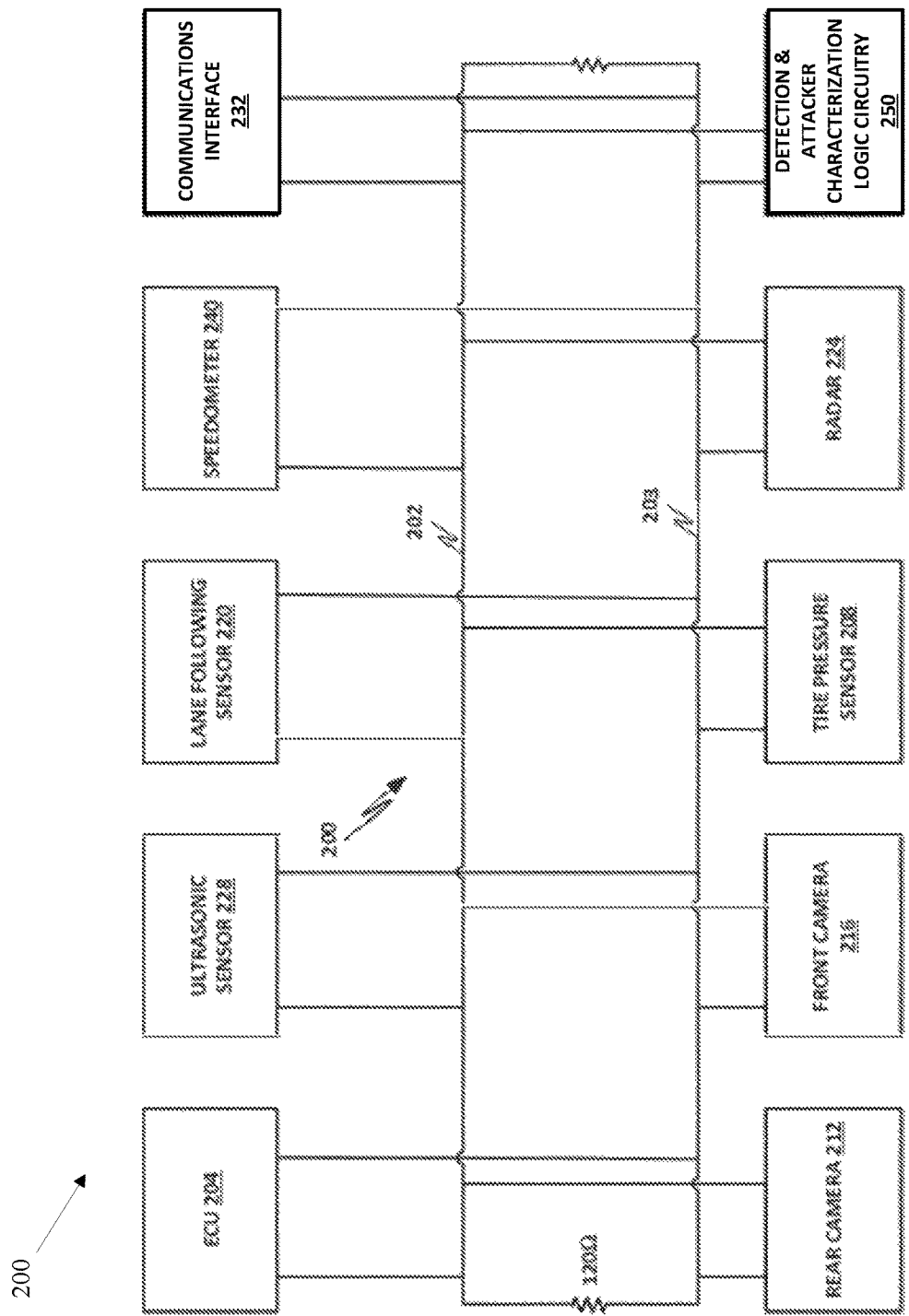
FIG. 2 depicts an embodiment of a block diagram of systems connected to an IVN such as a control area network (CAN)

FIG. 2 depicts an embodiment of a block diagram of systems connected to an IVN. In the present embodiment, the IVN bus is a CAN bus 200 that includes a high voltage wire 202 and a low voltage wire 203. Nodes on the CAN bus 200 may communicate by driving signals onto high voltage wire 202 and a low voltage wire 203 to represent logical zeroes and ones. The high voltage wire 202 and a low voltage wire 203 are terminated at their ends by a pair of 120-ohm resistors.

By way of illustrative and nonlimiting example, the CAN bus 200 has attached to it a number of nodes including an ECU 204, an ultrasonic sensor 228, a lane following sensor 220, a speedometer 240, a V2X interface 232, a rear camera 212, a front camera 216, tire pressure sensors 208, a radar 224, and a detection and attacker characterization logic circuitry 250. One or more of the nodes may include an ECU to, e.g., process sensor data or other data to perform a vehicle function or to display the sensor information to a user.

Various nodes on the CAN bus 200 may be considered to be peer nodes, and no node is necessarily elected or designated as a "master node." However, the detection and attacker characterization logic circuitry 250 may have particular security functions. Specifically, detection and attacker characterization logic circuitry 250 may be configured to monitor CAN bus 200, detect possible anomalies, and identify the possible anomalies as possible intrusions. In the case that detection and attacker characterization logic circuitry 250 identifies an anomaly or intrusion, generates an attack characterization or profile and may pass to the attack profile to a forensic logging and/or recovery system to log anomalies and/or to take appropriate remedial action, such as restarting an ECU, redirecting ECU operations to a backup ECU, warning an operator of the vehicle, querying an outside security vendor via the communications interface 232, and possibly forcing the vehicle to a safe resting position until the anomaly can be resolved and the vehicle can again be operated safely.

Figure 3:
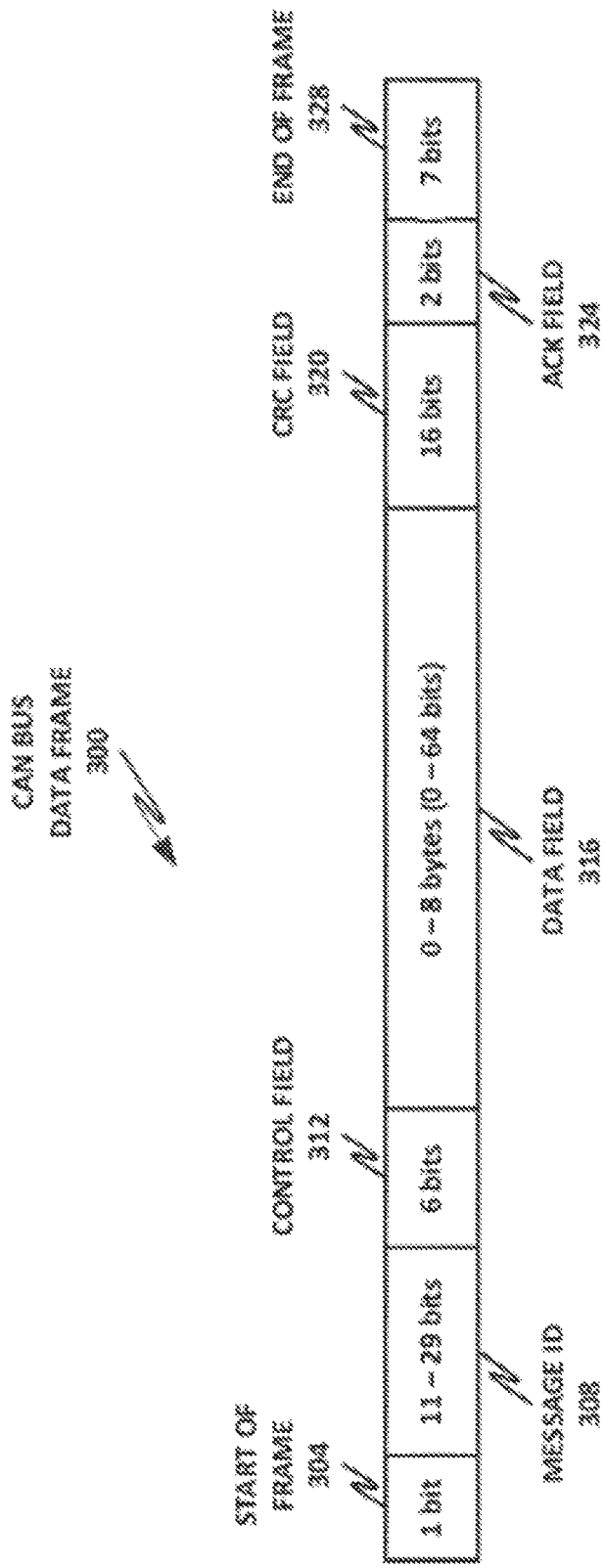
FIG. 3 depicts an embodiment of a block diagram of a CAN bus data frame.

FIG. 3 depicts an embodiment of a block diagram of a CAN bus data frame 300. Note that other IVN buses may use similar or the same data frames or frames with similar or the same information and/or field sizes. Other IVN buses may include, e.g., a CAN with flexible data-rate (CAN-FD) bus, a FlexRay bus, a local interconnect network (LIN) bus, an Ethernet, etc.

The CAN bus data frame 300 may include a 1-bit starter frame flag 304, followed by a message identifier (ID) 308. The message ID 308 may be between 11 and 29 bits that identify the set of signals transmitted in a data field 316. The CAN bus data frame 300 may also include a control field 312, which provides control data such as whether this is a standard or extended frame and a to request remote frames. The control field 312 may also include four bits that indicate the length of the data field.

The payload of CAN bus data frame 300 is included in the data field 316, which may include between 0 and 8 bytes (0 to 64 bits). The data field 316 is followed by a circular redundancy check (CRC) field 320 which is used for error detection. An ACK field 324 is used to transmit acknowledgments. And a 7-bit end of frame 328 terminates the CAN bus data frame 300.

The CAN bus data frame 300 includes up to 8 bytes of payload in data field 316 and, depending on the application, the data field 316 may be further partitioned into subfields that carry specific content. For example, a specific subfield may be used to carry the rotations per minute (RPM), wheel angles, speed, or other data points. In the automotive context, it has been observed that the majority of CAN bus messages are sent at regular time intervals. So, by examining a sequence of the same type of messages (for example, with the same message ID), it is possible to observe certain predictable patterns. Patterns may also be observed in a sequence of messages covering multiple types of messages.

A message sequence M on the CAN bus may be modeled as $M=\{ \ldots, m_{i-1}, m_i, m_{i+1} \ldots \}$, where $m_i$ is one of the messages and i describes the message ordering. Each message $m_i$ may contain up to 8 bytes of data in the data field 316, which may be modeled as $D_i=\{ \ldots, d_j\}$, where $D_i$ is 1 byte and $1<=j<=8$. Each individual byte may be interpreted as an individual decimal or hexadecimal value between 0 and 255 (or in the case of hexadecimal, between 0 and FF).

Considering the jth byte of all messages broadcast on the CAN bus within a time period, a numerical time series may be observed. For example, consider a case where the first byte is selected, and the first byte of each CAN bus data frame is plotted as a value between 0 and 255.

Observationally, it has been found that this time series can be modeled according to a regular data pattern. Note that different types of messages might have the same or similar data payloads, but over a time series, examining a fixed byte of a series of CAN bus data frames tends to yield similar graphs. Thus, when an attacker performs an attack on the CAN bus, such as via injection or spoofing, the malicious payload interrupts the normal series of the data stream, thus representing a deviation from the normal pattern. The present specification uses a time series anomaly detection scheme to identify anomalies in the data stream and identify them as potentially malicious.

Figure 4:
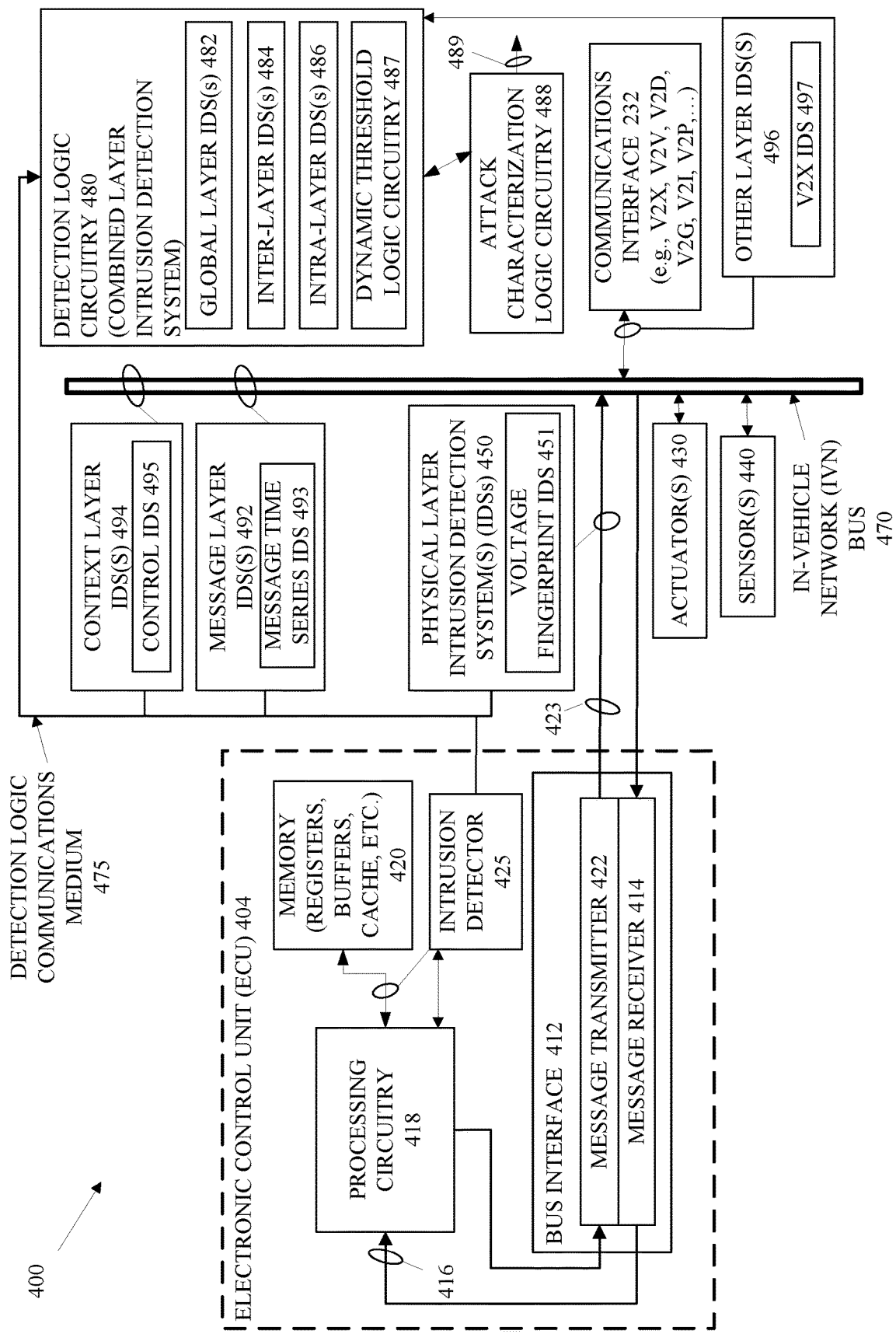
FIG. 4 depicts an embodiment of is an electronic control unit (ECU), multiple layers of IDSs, and a combined layer intrusion detection system (IDS) coupled with attack characterization logic circuitry.

FIG. 4 depicts an embodiment 400 of is an electronic control unit (ECU) 404, multiple layers of IDSs, and detection logic circuitry 480 of a combined layer intrusion detection system (IDS) coupled with attack characterization logic circuitry 488. The ECU 404 may comprise an ECU to process sensor information from the sensor(s) 440 such sensor information discussed in conjunction with FIGS. 1-2. The ECU 404 is just one example of an ECU and is configured to transmit a message on the in-vehicle network (IVN) bus 470 to the actuator(s) 430. The actuator(s) 430 may implement a physical process based on the messages from the ECU 404 and the sensor(s) 440 may detect a physical change based on activation of the actuator(s) 430 to provide feedback to the ECU 404 and/or other ECUs. Other embodiments may implement a different in-vehicle network.

In some embodiments, the ECU 404, memory 420 coupled with the ECU 404, and the bus interface 412 may reside on a single printed circuit board, may reside within a single chip package, and/or may reside on a single integrated circuit such as a system on a chip (SoC). Further embodiments of the ECU 404 may include an intrusion detector 425 and the intrusion detector 425 may reside on a single printed circuit board, may reside within a single chip package, and/or may reside on a single integrated circuit such as a system on a chip (SoC). In other embodiments, the intrusion detector 425 may couple with the ECU 404.

The ECU 404 may receive an input such as a reference signal 416 at the processing circuitry 418 via a message receiver 414 of the bus interface 412. The reference signal 416 may indicate an operation to be performed by a vehicle such as a magnitude of acceleration based on user input. The ECU 404 may transmit actuation commands via the message transmitter 422 of the bus interface 412 to direct operation of actuator(s) 430 via the IVN bus 470. The actuator(s) 430 may receive the actuation commands and perform a physical process, and the sensor(s) 440 may obtain sensor measurements of the components of the vehicle. The sensor(s) 440 may transmit or pass the sensor measurements to the processing circuitry 418 of the ECU 404.

The intrusion detector 404 may comprise logic circuitry configured to detect intrusions from a particular perspective such as an internal ECU layer. For instance, the sensor(s) 440 may comprise an accelerometer and the ECU 404 may control acceleration/deceleration responsive to input from a user. The intrusion detector 425 may monitor calls to read and store code and data in the memory 420 to determine if such calls deviate from a typical or standard pattern of reads and stores of code and or data. If the intrusion detector 425 determines that a deviation of the calls to read and store code and data exceeds a deviation threshold, the intrusion detector 425 may perform one or more operations to reduce the deviation such as rebooting the ECU or replacing the ECU 404 with a backup ECU, and/or the intrusion detector 425 may transmit an output indicative of the deviation, of a probability of an intrusion based on the deviation, and/or the like to the detection logic circuitry 480 of the combined layer IDS. In many embodiments, the intrusion detector 425 may transmit an indication of an intrusion via the IVN bus 470. In other embodiments, the intrusion detector 425 may transmit an indication of an intrusion via a bus or other medium such as the detection communications medium 475. Other embodiments may include other types of intrusion detectors to monitor the ECU at other layers.

The memory 420 may include, e.g., registers, cache, buffers, flash memory, random access memory, etc. to store code and data for the processing circuitry 418. The bus interface 412 may transmit and receive messages such as the IVN bus data frame 300 shown in FIG. 3. In many embodiments, the message transmitter may build and transmit via a connection 423 with the IVN bus 470 a data frame such as the CAN bus data frame 300 and include message IDs that are unique to ECU 404. Furthermore, the message receiver 414 may receive messages via the IVN bus 470 and discard and/or discontinue receipt of messages that are not intended for ECU 404 or that are not from a message source that the ECU 404 will receive. For instance, message receiver 414 may discard a message or ignore a message that does not originate from the expected ECU transmitted. The message receiver 414 may discard a message or ignore a message that does not include the message ID of a source ECU or message ID for sensor(s) 440 in the message ID field of the message that the receiver 414 is configured to receive.

The IVN bus 470 may have multiple ECUs such as the ECU 404. Each ECU may be associated with and/or may provide information for use by one or more of the vehicle sub-systems connected to the IVN bus 470. While the ECUs may be configured similarly or differently from the ECU 404, each of the ECUs may couple with the IVN bus 470 via a bus interface such as the bus interface 412 to transmit and receive messages.

The detection logic circuitry 480 of the combined layer IDS may receive as input, information output from two or more intrusion detectors such as the intrusion detector 425 and/or IDSs such as the physical layer IDSs 450, the message layer IDSs 492, the context layer IDSs 494, and/or the other layer IDSs 496 via the detections logic communications medium 475 and/or the IVN bus 470. The combined detection logic circuitry 480 of the combined layer IDS may also or alternatively receive as input, information output from global layer IDSs 482, inter-layer IDSs 484, and/or intra-layer IDSs 486. In further embodiments, the detection logic circuitry 480 of the combined layer IDS may receive as input, information output from two or more of intrusion detectors and/or the IDSs 450, 482, 484, 486, 492, and 494, or any combination thereof.

While the detection logic circuitry 480 includes the global layer IDSs 482, inter-layer IDSs 484, and/or intra-layer IDSs 486, in other embodiments, the detection logic circuitry 480 may include as few as one global IDS, one inter-layer IDS, or one intra-layer IDS. In several embodiments, the detection logic circuitry 480 may include a set of one or more of the IDSs 450, 482, 484, 486, 492, 494, and 496 for one or more sub-systems or groups of sub-systems connected to an in-vehicle network.

The detection logic circuitry 480 may comprise code and data to execute in an ECU such as the ECU 404 with processing circuitry 418, memory 420, and a bus interface 412. In some embodiments, the detection logic circuitry 480, as well as other ECUs like ECU 404, may comprise code and data stored in flash memory (or other non-volatile, reprogrammable memory) and have a processor with registers and/or buffers and/or other random access memory to execute code loaded from the flash memory.

The detection logic circuitry 480 may monitor one or more control units such as the ECU 404 at one or more observation layers of an in-vehicle network. The intrusion detector may reside at an internal ECU observation layer. The physical layer IDSs 450, the message layer IDSs 492, and the context layer IDSs 494 may monitor external signals of the ECU 404. For example, the physical layer IDSs 450 may include a voltage fingerprint (FP) IDS 451 to monitor voltage patterns on the output 423 of the message transmitter 422 of the bus interface 412. The voltage FP IDS 451 may detect patterns of bits based on voltages output from the message transmitter 422 to the IVN bus. To illustrate, the voltage FP IDS 451 may monitor the output 423 for an end of frame pattern and a start of frame bit to identify the start of a message ID in an IVN bus data frame such as the CAN bus data frame 300. Upon identification of the start of the message ID, the voltage FP IDS 451 may compare the pattern of voltages for the message ID to the message ID for the ECU 404 to determine if the ECU is correctly identifying the source of the messages being transmitted from the ECU 404.

If the ECU 404 is not including the correct message ID in each transmitted frame, the voltage FP IDS 451 may transmit a message to the detection logic circuitry 480 via the detection logic communications medium 475 or via the IVN bus 470. The message may indicate the occurrence of suspicious activity by the ECU 404.

The message layer IDSs 492 may include a message time series (MTS) IDS 493 to monitor a sequence of messages transmitted by the ECU 404 or a group of ECUs including the ECU 404. In many embodiments, the MTS IDS 493 may establish one or more windows of time (or time periods) during which the MTS IDS 493 captures a sequence of messages on the IVN bus. The MTS IDS 493 may interpret the sequence of messages to determine if the pattern of messages in the sequence of messages deviates from the predicted pattern of messages for the ECU 404 specifically, for a group of ECUs including the ECU 404, for a group of ECUs that consume messages from the ECU 404, for all ECUs, and/or for all messages transmitting via the IVN bus 470.

The MTS IDS 493 may determine a deviation between the observed sequence of messages and the predicted sequence of messages and compare the deviation to a threshold deviation to determine whether the observed sequence of messages represent suspicious activity. If the observed sequence of messages represents suspicious activity, the MTS IDS 493 may transmit a message to the detection logic circuitry via the IVN bus 470 or the detection logic communications medium 475.

The context layer IDSs 494 may include a control IDS 495 to monitor messages transmitted by the ECU 404 or a group of ECUs including the ECU 404. In many embodiments, the control IDS 495 may establish one or more windows of time (or time periods) during which the control IDS 495 captures messages on the IVN bus. The control IDS 495 may interpret the messages to compare messages from the ECU 404 and/or a group of messages from ECUs associated with the ECU 404 to determine if any one or more of the messages presents information that contradicts a context of the vehicle within which the ECU 404 and the detection logic circuitry 480 resides. For example, the ECU 404 may transmit messages including a speed detected by a speed sensor. The speed sensor of the sensor(s) 440 may comprise a set of wheel sensors that transmit pulses as the wheel rotates. The wheel sensors may transmit a message to the ECU 404 including a number associated with the number of pulses detected by the wheel sensors over a defined period of time. The ECU 404 may calculate the speed based on the number of pulses indicated and may transmit a message on the IVN bus 470 indicating the speed at which the vehicle is traveling.

The control IDS 495 may receive the message from the ECU 404 with the speed and compare the speed with a speed calculated by another ECU based on receipt of GPS information. The comparison may result in a residual difference in the speed determined via the GPS information and the speed determined via the wheel sensors. Thereafter, the control IDS 495 may compare the residual difference between the speeds to a detection threshold and transmit an indication about suspicious transmissions if the residual difference exceeds the detection threshold.

In the present embodiment, the IVN bus 470 may receive communications from outside of the in-vehicle network via a communications interface 232 such as a V2X, V2V, V2D, V2G, V2I, and V2P communications. For example, the vehicle (such as the vehicle 100 shown in FIG. 1) may receive, e.g., messages from infrastructure like markers in the road or on the side of the road or via other vehicles on the road. The markers may be, e.g., mile markers (or partial mile markers such as 100 yards, 200 yards, etc.) that may also provide other information such as lane positioning and a vehicle such as the vehicle 100 may include an ECU such as ECU 404 to receive information from the communications interface 232 via the IVN bus 470. In other embodiments, the ECU may receive the information via another network (such as a wireless network) or bus, or a different type of in-vehicle bus.

The present embodiment may also comprise other layer IDSs 496 to monitor communications received via the communications interface 232 for intrusion. The other layer IDSs 496 may include a V2X IDS 497 to monitor V2X messages received via the communications interface 232 as the messages are communicated to one or more ECUs via the IVN bus 470. The V2X IDS 497 may monitor incoming and/or outgoing messages via the communications interface 232 based on one or more of various techniques such as measuring the voltage FP of the messages. The message layer IDSs 492 may also include, e.g., an MTS IDS 493 to monitor messages specifically from the communications interface 232 for V2X, all messages from the communications interface 232, all message related to a sub-system that utilizes V2X messages, all messages on the IVN bus 470, and/or the like.

The detection control circuitry 480, which is the combined layer IDS in the present embodiment, may monitor outputs from intrusion detectors such as intrusion detector 425 (if applicable) and may monitor outputs from the one or more of the IDSs 450, 492, 494, 496, or any combination thereof via the IVN bus 470 or the detection communications medium 475. The detection control circuitry 480 may comprise one or more layers of IDSs that combine outputs from other IDSs such as the global layer IDSs 482, the inter-layer IDSs 484, and the intra-layer IDSs 486.

Note that each one of the global layer IDSs 482, the inter-layer IDSs 484, and the intra-layer IDSs 486 may receive as input, outputs of one or more other IDSs of the global layer IDSs 482, the inter-layer IDSs 484, and the intra-layer IDSs 486.

The detection control circuitry 480 may comprise dynamic threshold logic circuitry 487. The dynamic threshold logic circuitry 487 may dynamically adjust thresholds of IDSs such as physical layer IDSs 450, message layer IDSs 492, context layer IDSs 494, and/or other layer IDSs 496. For example, upon receipt of one or more outputs indicating suspicious activity from the voltage FP IDS 451 that monitors the output of the ECU 404, the dynamic threshold logic circuitry 487 may adjust the detection threshold of an MTS IDS 493 that monitors the messages from the ECU 404 on the IVN bus 470 to increase or decrease the sensitivity of the MTS IDS 493. The dynamic threshold logic circuitry 487 may determine to increase or determine to decrease the sensitivity based on one or more of various factors such as a historical tendency to indicate false positives of suspicious activity by the IDS, a machine learning model that considers outputs of the IDS and/or other IDSs, a configuration of a particular IDS, a type of suspicious activity detected by another IDS, a level of safety concern for the IDS that detected the suspicious activity, the number of other IDSs in a sub-system or system-wide that detected suspicious activity, whether the sensitivity of the IDS has been adjusted recently or already differs from a default detection threshold, and/or the like.

The global layer IDSs 482 may comprise one or more global layer IDSs. Each global layer IDS may on one or more ECUs, one or more groups of ECUs, one or more of the in-vehicle network sub-systems, and/or all the ECUs and/or in-vehicle network sub-systems. A global IDS may combine, for example, outputs from one or more intra-layer IDSs 486, one or more inter-layer IDSs 484, one or more other global layer IDSs 482, one or more physical layer IDSs 450, one or more message layer IDSs 492, one or more context layer IDSs 494, one or more other layer IDSs 496, and/or any combination thereof to determine whether suspicious activity indicated by an IDS represents an intrusion, or attack, on the vehicle. For example, a first global layer IDS of the global layer IDSs 482 may combine outputs from the voltage FP IDS 451, the MTS IDS 493, and the control IDS 495. The voltage FP IDS 451 may output an indication of suspicious activity at the physical layer by the ECU 404. The first global layer IDS may instruct the dynamic threshold logic circuitry 487 to decrease the detection threshold of the MTS IDS 493 that monitors the ECU 404 to increase the chance of detecting a suspicious sequence of messages related to the ECU 404.

The dynamic threshold logic circuitry 487 may instruct the MTS IDS 493 to decrease the detection threshold by, e.g., 10 percent, 5 percent, 1 percent, or another percentage to increase the sensitivity accordingly. The MTS IDS 493 may decrease the detection threshold and begin to detect a suspicious pattern or sequence of messages from the ECU 404 and from ECUs that consume messages transmitted by the ECU 404. In response to detection of the suspicious activity, the MTS IDS 493 may output on the IVN bus 470, on the detection logic communications medium, and/or directly to the attack characterization logic circuitry 488, an indication of the suspicious activity.

In response to receipt of the output from the MTS IDS 493 indicating suspicious activity, the first global layer IDS may instruct the dynamic threshold logic circuitry 487 to lower the detection threshold of the control IDS 495 that monitors a longitudinal control sub-system of the in-vehicle network to increase the sensitivity for an attack. The control IDS 495 may lower the detection threshold and detect suspicious activity in longitudinal control messages on the IVN bus 470 based on a determination that the magnitude of the speed indicated in messages based on wheel sensors differs from the speed indicated in messages based on the road markers by e.g. 15 percent or more. In response, the control IDS 495 may output an indication of suspicious activity to the attack characterization logic circuitry 488 directly or via the IVN bus 470 or the detection logic communications medium 475.

The first global IDS may receive the indication of suspicious activity from the control IDS 495 and, based on a combination of the outputs from the voltage FP IDS 451 (physical layer IDS), from the MTS IDS 493 (context layer IDS), and the control IDS 495 (context layer IDS), the first global IDS may determine that the in-vehicle system is being attacked and output an indication of the attack to the attack characterization logic circuitry 488. For instance, the first inter-layer IDS may combine the inputs via a majority vote, a machine learning model trained with supervised training, a weighted vote, and/or a vote by IDSs that have more recent training to determine if the outputs represent an attack. In other embodiments, the first global layer IDS may perform the same operations without instructing the dynamic threshold logic circuitry 487 to reduce the detection thresholds of one or more of the IDSs. Furthermore, some embodiments do not include the dynamic threshold logic circuitry 487.

The attack characterization logic circuitry 488 may determine or generate an attack profile, or attack characterization, based on the input from one or more of the physical layer IDSs 450, message layer IDSs 492, and/or content layer IDSs 494 and output the attack characterization 489 to a forensic logging and/or recovery system in response to an indication that the in-vehicle network is being attacked or intruded to log the anomaly/intrusion and/or to facilitate selection of an appropriate remedial action. The attack characterization logic circuitry 488 may also, advantageously, receive outputs from and determine or generate an attack profile, or attack characterization, based on the outputs from one or more of the other IDSs 496 such as the V2X IDS 497.

The attack characterization logic circuitry 488 may, advantageously, generate the attack characterization as the attack occurs by building a list of related suspicious activity in order of occurrence. For example, the voltage FP IDS 451 may output the indication of suspicious activity from ECU 404 and possibly other ECUs in a common sub-system or that generates messages consumed by a common sub-system. As a result, the attack characterization logic circuitry 488 may store an indication of each ECU that originates a suspicious message (origin ECU) at, e.g., time t1; an indication of each ECU that consumes the messages to generate another message (target ECUs); the signals compromised by the attack such as the messages output by the target ECUs like the speed of the vehicle based on the wheel sensor information; the possible type(s) of attack such as masquerading if the voltage FP IDS monitors the message ID for the ECU; and, in some embodiments, additional detail about the attack such as the percent deviation caused by the attacks from predicted behavior and the frequency of the attacks.

The attack characterization logic circuitry 488 may output the attack characterization 489 to a forensic logging and/or recovery system to advantageously log the attack/anomaly and/or to facilitate an informed selection of a recovery routine. The attack characterization logic circuitry 488 may similarly create and output the attack characterization 489 in response to an indication of an attack from any IDS of the detection logic circuitry 480.

The inter-layer IDSs 484 may combine outputs of suspicious activity from IDSs of two different layers such as the physical layer IDSs 450 and the message layer IDSs 492, the message layer IDSs 492 and the context layer IDSs 494, and/or the physical layer IDSs 450 and the context layer IDSs 494. For example, the inter-layer IDSs 484 may comprise a first inter-layer IDS to combine outputs from the voltage FP IDS 451 and the MTS IDS 493. The voltage FP IDS 451 may generate an output indicating that an observed voltage pattern output by the ECU 404 deviates from a predicted pattern of voltages by more than a detection threshold. The MTS IDS 493 may output an indication of suspicious activity based on messages that deviate from predicted sequences of messages by more than a detection threshold from the ECU 404 and one or more of the ECUs, which consume the messages (victim ECUs) from the ECU 404.

The first inter-layer IDS and the attack characterization logic circuitry 488 may receive the outputs from the voltage FP IDS 451 and the MTS IDS 493. The first inter-layer IDS may combine the outputs to determine whether the suspicious activity represents an intrusion (attack) and may output an indication that the suspicious activity is an attack based on the combination of the outputs to the attack characterization logic circuitry 488. For instance, the first inter-layer IDS may combine the inputs via a majority vote, a machine learning model trained with supervised training, a weighted vote, and/or a vote by IDSs that have more recent training to determine if the outputs represent an attack.

The intra-layer IDSs 486 may combine outputs of suspicious activity from IDSs of the same layer such as the physical layer IDSs 450, the message layer IDSs 492, the context layer IDSs 494, or the other layer IDSs 496. For example, the intra-layer IDSs 486 may comprise a first intra-layer IDS to combine outputs from a first voltage FP IDS 451 that monitors ECU 404 and one or more other voltage FP IDSs 451 that monitor one or more other ECUs. The first voltage FP IDS 451 may generate an output indicating that an observed voltage and/or timing pattern output by the ECU 404 deviates from a predicted pattern by more than a detection threshold. A second voltage FP IDS 451 may generate an output, which may indicate a second ECU did not detect a voltage and/or timing pattern that deviates from a predicted voltage and/or timing pattern. A third voltage FP IDS 451 may generate an output, which may indicate a third ECU did not detect a voltage and/or timing pattern that deviates from a predicted voltage pattern.

The first intra-layer IDS and the attack characterization logic circuitry 488 may receive the output from the first voltage FP IDS 451. The first inter-layer IDS may combine the outputs to determine whether the suspicious activity represents an intrusion (attack) and may output an indication that the suspicious activity is not an attack based on the combination of the outputs. For instance, the first inter-layer IDS may combine the inputs via a majority vote. The majority vote from the first, second and third IDS is that there was not suspicious activity from the group of ECUs as a whole.

The attack characterization logic circuitry 488 may discard the output from the first voltage FP 451 if the attack characterization logic circuitry 488 does not receive confirmation of an attack from the detection logic circuitry 480 of the combined layer IDS. In other embodiments, the receipt of an output from one or more IDSs by the attack characterization logic circuitry 488 may represent a confirmation of an attack so the attack characterization logic circuitry 488 may output an attack characterization 489 to a forensic logging and/or recovery system.

In another example, the physical layer IDSs 450 may receive the sensor measurements which indicate that the wheel speed has exceeded a safe threshold, but the ECU 404 may ignore the indication from the sensor(s) 440. The physical layer IDSs 450 may transmit a signal to one or more global layer IDSs 482, one or more inter-layer IDSs 484, and one or more intra-layer IDSs 486 of the detection logic circuitry 480 of the combined layer intrusion detection system. An intra-layer IDSs 484 may determine if other ECU's exhibit uncharacteristic or unexpected behavior at or near the same time. An inter-layer IDSs 484 may monitor a message sequence on a message layer and determine that the message sequence deviates from the predicted message sequence by more than a detection threshold. As a result, the inter-layer IDSs 484 may output a message on the IVN bus 470 or the detection logic communications medium 475 to indicate an intrusion.

The attack characterization logic circuitry 480 may generate an attack characterization as the reports of suspicious activity and intrusions are received and may output the attack characterization 489 upon confirmation of an attack. Confirmation of the attack, in some embodiments, may occur upon receipt of the corroborating activity for the physical layer IDSs 450 from the message layer IDSs 492 or from the context layer IDSs 494. In other embodiments, the confirmation of an attack awaits a determination by the detection logic circuitry 480.

Figure 5:
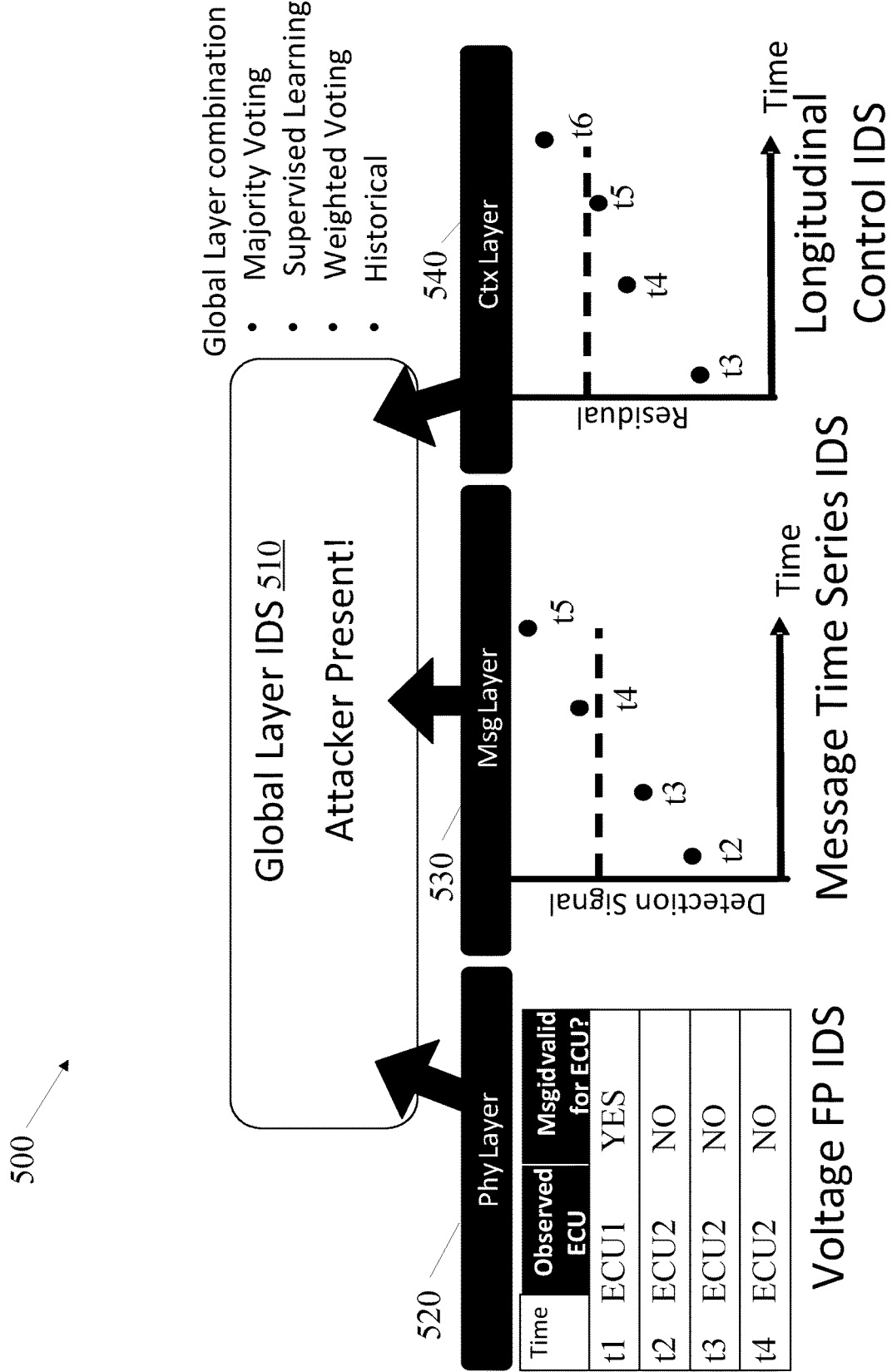
FIG. 5 depicts an embodiment of is a global layer IDS.

FIG. 5 depicts an embodiment 500 of is a global layer IDS 510. The global layer IDS 510 depicts one IDS of detection logic circuitry such as the detection logic circuitry 480 in FIG. 4. The global layer IDS 510 may receive as input, outputs of suspicious activities or intrusions from the physical layer 520, the message layer 530, and the context layer 540. The physical layer input may be generated by voltage FP IDS and the voltage FP IDS may observe the output of messages by an ECU1 onto an in-vehicle bus such as the IVN bus 470 in FIG. 4.

In some embodiments, the physical layer 520 may output four messages at times t1, t2, t3, and t4. At time t1, the voltage FP IDS may output an indication that the observed voltage FP for the message ID is ECU1, which matches the predicted message ID, so the message indicates that the ECU1 output a message to the in-vehicle bus at time t1 that had a valid message ID. Note that in the present embodiment, the IDS may output messages to indicate suspicious activity and messages to indicate no suspicious activity to advantageously facilitate detection of suspension attacks wherein malicious code suspends message transmissions by an ECU. In other embodiments, the IDS may not output messages that indicate no suspicious activity.

At time t2, the message output by ECU1 may include an observed message ID for ECU2. The physical layer 520 may respond to the invalid message ID by outputting an indication of an intrusion or of suspicious activity. In some cases, for instance, natural occurrences such as environmental influences can cause voltages to vary so the voltage FP at time t2 may not necessarily be an attack.

At time t3, the message output by ECU1 may include an observed message ID for ECU2. The physical layer 520 may respond to the invalid message by outputting an indication of an intrusion or of suspicious activity. Similarly, at time t4, the message output by ECU1 may include an observed message ID for ECU2. The physical layer 520 may respond to the invalid message by outputting an indication of an intrusion or of suspicious activity.

The message layer 530 may include an MTS IDS to monitor message sequences on the in-vehicle bus. The graph shows time increasing along the x-axis from left to right. The times t2, t3, t4, and t5 are times at which the MTS IDS captured a time window of messages transmitted within the in-vehicle network bus. The y-axis represents the magnitude of the deviation from a predicted sequence of messages. The sequence of messages may be a filtered set of messages such as messages only transmitted from ECU1, messages transmitted from a group of related ECUs such as ECUs that receive messages from ECU1 and, possibly, other ECUs that transmit messages for consumption by ECUs that consume the messages from ECU1.

The message layer 530 begins at time t2 to illustrate a latency between the output of the messages by the ECU1 and monitoring messages from the ECU1 on an in-vehicle network bus. For instance, the MTS IDS may see the message output by the voltage FP IDS at time t1 and at time t2 in the message layer 530. In this embodiment, the MTS IDS does not notice an intrusion for the in-vehicle network bus until time t4 and time t5. For instance, messages from a single ECU that are out of sequence periodically may not deviate from the predicted sequences sufficiently to surpass the detection threshold depending on the sensitivity of the detection threshold, which may, advantageously, avoid or attenuate generation of false detections of suspicious activity. However, repeated changes in the message ID of the messages transmitted by the ECU1 to a message ID for ECU2 may be sufficient as shown at times t4 and t5. In other embodiments, the increase in the deviation from t2 to t4 may result from additional messages from other ECUs that consume the message from ECU1 and, as a result, generate messages that deviate from standard patterns of the other ECUs.

The context layer 540 may monitor messages to determine if the messages communicated via the in-vehicle network match the context of other messages transmitted via the in-vehicle network. For instance, IDSs in the context layer 540 may verify that the speed determined from the wheel sensors or speedometer cable match the speed from the GPS sensors, that the speed increases as predicted in response to a magnitude of an acceleration at a 10 degree incline, that acceleration magnitude indicated by messages from user input are consistent with changes in acceleration indicated by an accelerometer, that requests from user input to roll down a power window are consistent with messages from an ECU to control the power window, and/or the like.

The context layer 540 illustrates a graph with time increasing from left to right along the x-axis and including data points at times t3, t4, t5, and t6. The context layer 540 begins at time t2 to illustrate a latency between the output of the messages by the ECU1, the MTS IDS time window captures, and monitoring messages from the ECU1 in the context layer 540 on an in-vehicle network bus.

In the present embodiment, the context layer 540 may comprise a longitudinal control IDS. The longitudinal control IDS does not detect a contextual issue with messages transmitted via the in-vehicle network bus until time t6. In some embodiments, a dynamic threshold logic circuitry may adjust the sensitivity of the MTS IDS and/or the longitudinal control IDS by adjusting the magnitude of deviation from predicted patterns. The dashed lines in the message layer graph 530 and the context layer graph 540 represent detection thresholds for the respective layers. Increasing the sensitivity would lower the dashed lines and decreasing the sensitivity would raise the dashed lines. Note that lowering the dashed line (detection threshold) in the context layer by a small percentage may position the result a time t5 above the threshold and, thus, cause transmission of an output to indicate the suspicious activity at time t6.

The global layer IDS 510 may combine the input from the physical layer 520, the message layer 530, and the context layer 540. The global layer IDS 510 may determine the combination by any one or combination of a majority voting model, machine learning model trained via supervised training, a weighted voting model, and voting model with selective input based on historical training of the IDSs. The voting model with selective input based on historical training of the IDSs may select outputs to combine for voting based on a determination that the historical data used to train the model is still valid or has a low margin of error.

Figure 6:
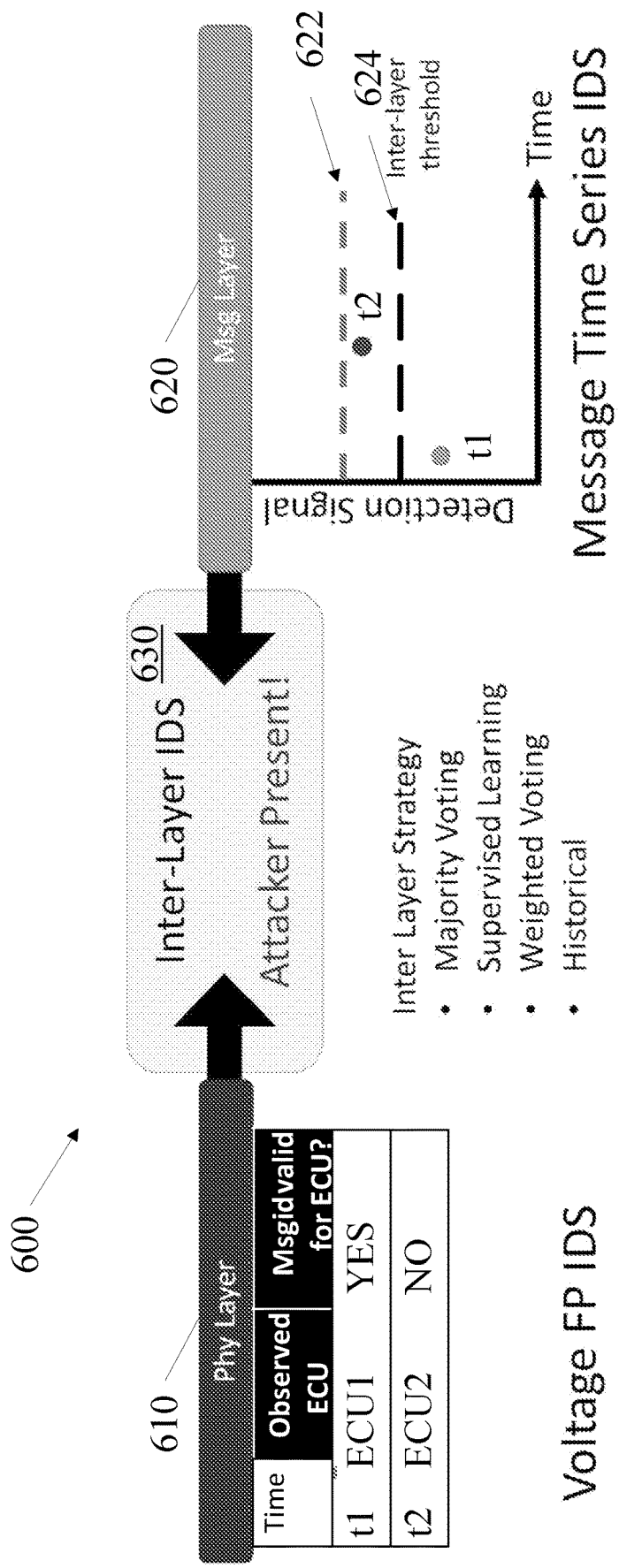
FIG. 6 depicts an embodiment of is an inter-layer IDS.

FIG. 6 depicts an embodiment 600 of is an inter-layer IDS 630. The inter-layer IDS 630 may combine outputs from a physical layer 610 and a message layer 620. The physical layer 610 may include a voltage FP IDS and include detection of no suspicious activity from ECU1 at time t1 and suspicious activity at time t2 in the form of an incorrect message ID in a message transmitted by the ECU1. The message layer 620 may include an MTS IDS and a graph of the outputs of the MTS IDS is shown. The graph has an x-axis with time increasing from left to right and a y-axis that illustrates the magnitude of deviation from a predicted message sequence increasing from the bottom of the y-axis to the top. The dashed lines 622 and 624 show different detection thresholds for a determination of an intrusion or suspicious activity. Furthermore, the graph shows two data points, a first data point at time t1 and a second data point at time t2.

In response to detection of the incorrect message ID in a message transmitted by the ECU1, the voltage FP IDS may output an indication of an intrusion or suspicious activity to the inter-layer IDS 630. The inter-layer IDS 630 may determine to adjust the sensitivity of the MTS IDS of the message layer 620 by reducing the detection threshold from original or default detection threshold illustrated as dashed line 622 to the adjusted detection threshold illustrated by the dashed line 624. In many embodiments, the inter-layer IDS 630 may instruct or activate dynamic threshold logic circuitry such as the dynamic threshold logic circuitry illustrated in FIG. 4 to adjust the detection threshold of the MTS IDS between time t1 and time t2 to, advantageously, increase the chance that the MTS IDS detects suspicious activity or intrusions at time t2 and beyond.

The inter-layer IDS 630 may combine the outputs of the physical layer 610 and the message layer 620 via one or more models such as a majority voting model, a machine learning model trained via supervised learning, a weighted voting model, and/or a historical model to select the IDSs with valid or current historical training.

Figure 7:
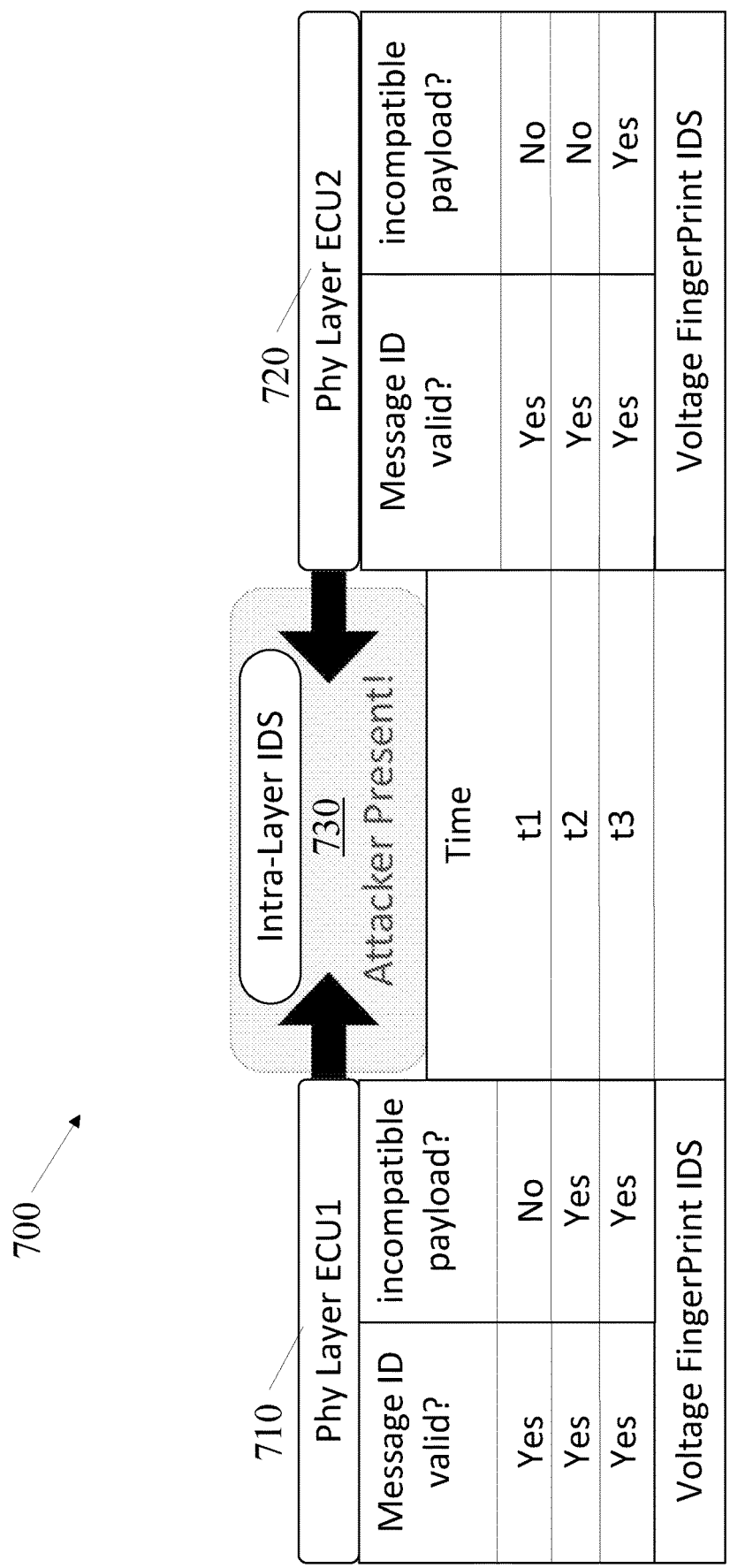
FIG. 7 depicts an embodiment of is an intra-layer IDS.

FIG. 7 depicts an embodiment 700 of is an intra-layer IDS 730. The intra-layer IDS 730 may combine outputs from a physical layer 710 voltage FP IDS for ECU1 and a physical layer 720 voltage FP IDS for ECU2. The physical layer 710 voltage FP IDS may detect the message ID and the payload of messages transmitted by the ECU1 and the physical layer 720 voltage FP IDS may detect the message ID and the payload of messages transmitted by the ECU2.

Both the physical layer 710 and the physical layer 720 include tables showing outputs generated by the respective voltage FP IDSs for times t1, t2, and t3. At time t1, both the physical layer 710 voltage FP IDS for ECU1 and the physical layer 720 voltage FP IDS for ECU2 determine that the voltage pattern of the message transmitted by the ECUs include valid messages and compatible payloads. In other words, the payloads are consistent or within a detection threshold of being payloads predicted for messages transmitting from the respective ECUs.

At time t2, the physical layer 710 voltage FP IDS for ECU1 determines that the message ID of a message transmitted by ECU1 is valid, but the payload is incompatible. At time t2, the physical layer 720 voltage FP IDS for ECU2 determines that the message ID is valid and the payload is compatible.

At time t3, both the physical layer 710 voltage FP IDS for ECU1 and the physical layer 720 voltage FP IDS for ECU2 determine that the voltage pattern of the message transmitted by the ECUs include valid messages and incompatible payloads.

The intra-layer IDS 730 may combine the outputs from the physical layer 710 voltage FP IDS for ECU1 and the physical layer 720 voltage FP IDS for ECU2 to determine whether an attack is occurring. The combination may involve any one or combination of one or more of a majority voting model, a machine learning model trained via supervised learning, a weighted voting model, and/or a historical model to select the IDSs with valid or current historical training.

Figure 8:
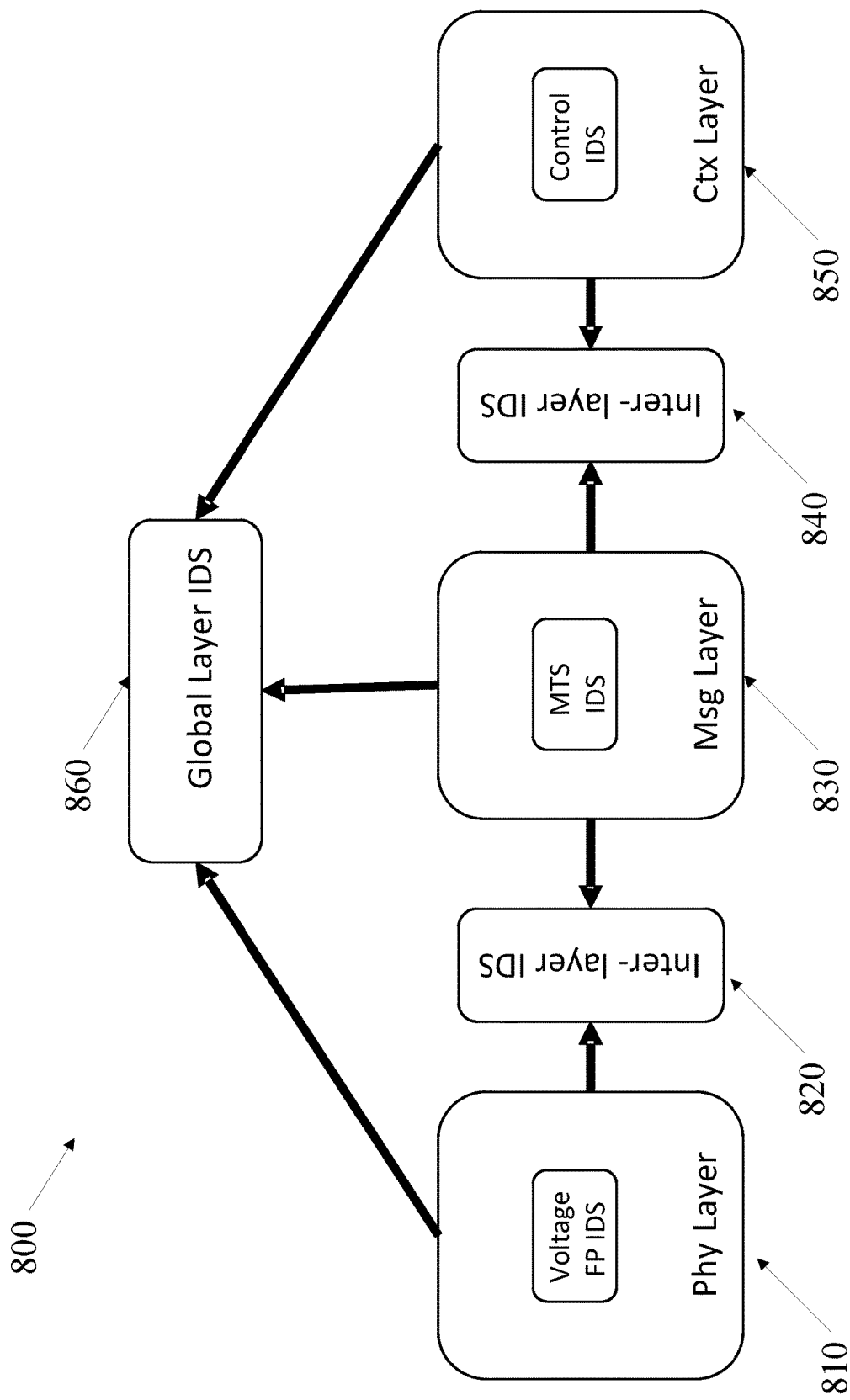
FIGS. 8-9 depict embodiments of a combined layer IDS and a balance between confidence and latency for various observation layer IDSs.
Figure 9:
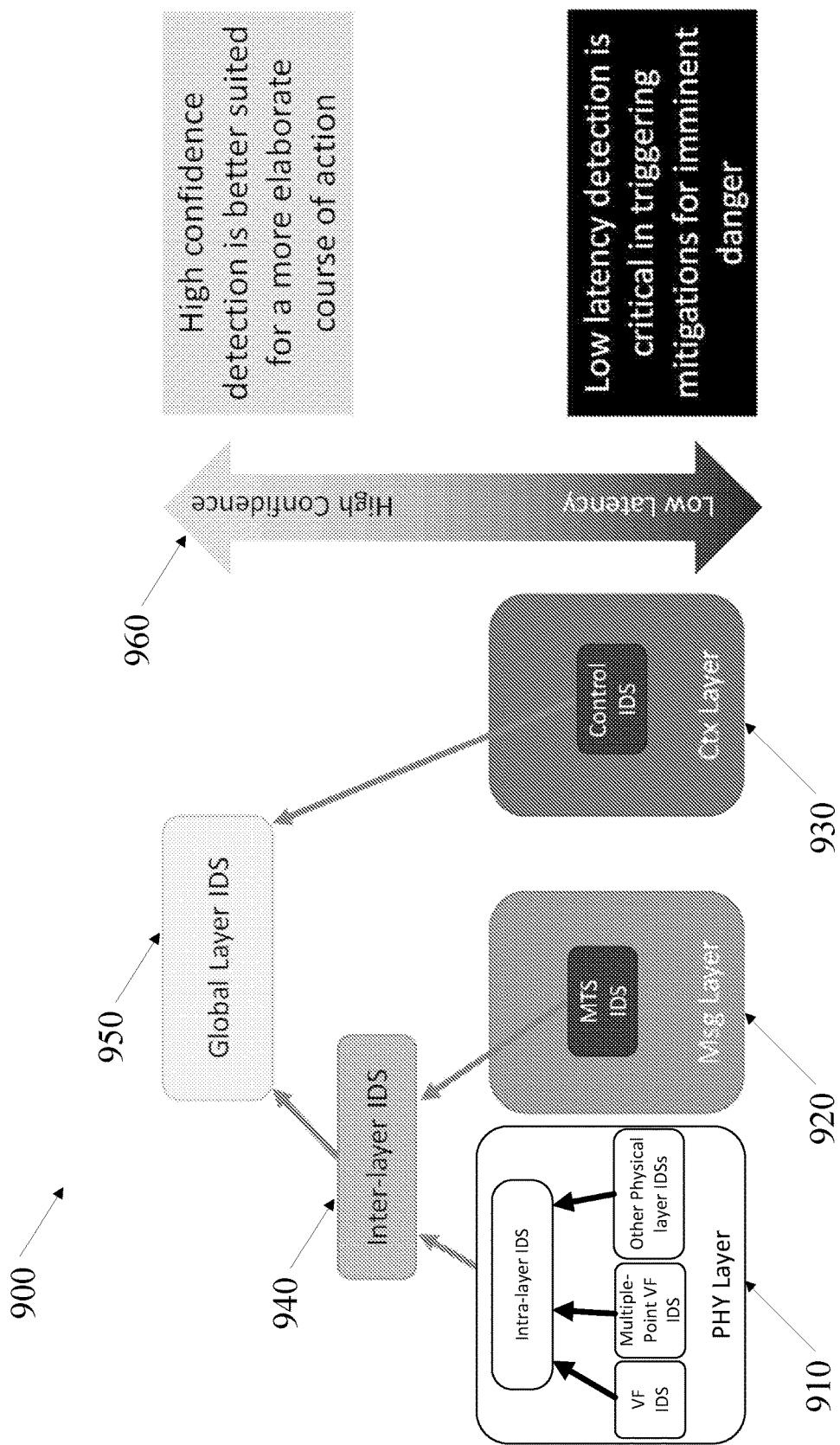

FIGS. 8-9 depict embodiments of a combined layer IDS and a balance between confidence and latency for various observation layer IDSs. FIG. 8 illustrates an embodiment of a combined layer IDS architecture 800. The combined layer IDS architecture 800 comprises a physical layer 810 with a voltage FP IDS, a message layer 830 with an MTS IDS, and a context layer 850 with a control IDS. An inter-layer IDS 820 may combine the outputs of one or more IDSs in the physical layer 810 and one or more IDSs in the message layer 830. An inter-layer IDS 840 may combine the outputs of one or more IDSs in the message layer 830 and one or more IDSs in the context layer 850. Furthermore, the global layer IDS 860 may combine outputs from one or more IDSs in the physical layer 810, one or more IDSs in the message layer 830, and one or more IDSs in the context layer 850.

FIG. 9 depicts another embodiment of a combined layer IDS 900 illustrating a balance between confidence and latency for various observation layer IDSs. The combined layer IDS 900 includes a physical layer 910 with several different physical layer IDSs including a voltage fingerprint (VF) IDS, a multiple-point VF IDS, and other physical layer IDSs. An intra-layer IDS of the physical layer 910 also combines the outputs of the VF IDS, multiple-point VF IDS, and other physical layer IDSs.

The message layer 920 includes an MTS IDS and the context layer 930 includes a control IDS. An inter-layer IDS 940 may combine outputs from the MTS IDS and the intra-layer IDS. In other embodiments, the inter-layer IDS 940 may combine the outputs of the VF IDS, the multiple-point VF IDS, the other physical layer IDSs, and the MTS IDS. Furthermore, a global layer IDS 950 combines the outputs of the inter-layer IDS 940 and control IDS of the context layer 930.

A scale is included to the right of the combined layer IDS 900. The scale shows a latency for detection determinations ranging from low latency to high confidence and the scale relates to the height of the IDS in the combined layer IDS with respect to the scale. The high confidence, which is shown a level of the global layer IDS 950 also has the largest latency in the present embodiment because the global layer IDS 950 has to wait for a determine from each of the the VF IDS, the multiple-point VF IDS, the other physical layer IDSs, the intra-layer IDS, and the interlayer IDS as well as the control IDS prior to making a determination about detection of an attack. The low latency is at or near the level of the VF IDS, the multiple-point VF IDS, and the other physical layer IDSs because these IDSs have the information required to make a decision upon transmission of the first message from an ECU. The MTS IDS and the context IDS are above the VF IDS, the multiple-point VF IDS, and the other physical layer IDSs in the physical layer 910 because the MTS IDS and the context IDS monitor a window of messages on an in-vehicle bus after transmission of the messages from the ECUs.

The intra-layer IDS is above the MTS IDS and the context IDS because the intra-layer IDS waits for determinations by the VF IDS, the multiple-point VF IDS, and the other physical layer IDSs. The inter-layer IDS 940 is above the MTS IDS and the intra-layer IDS because the inter-layer IDS waits for determinations by the MTS IDS and the intra-layer IDS prior to combining the outputs from the MTS IDS and the intra-layer IDS. Note that the relative latencies between some of the IDS may vary between embodiments depending on the configuration of the combination layer IDS.

The high confidence detection may be better suited for more elaborate course of action to address an attack and the low latency detection may be critical in triggering mitigation procedures to address attacks that threaten imminent danger such as attacks on critical systems during operation of the vehicle. Note also that combinations of low latency and high confidence IDSs related to the same attacks can, advantageously, provide the lowest latency mitigation while offering the highest confidence comprehensive recovery procedure, particularly when combined with attack characterization logic circuitry such as the attack characterization logic circuitry 488 shown in FIG. 4.

Figure 10:
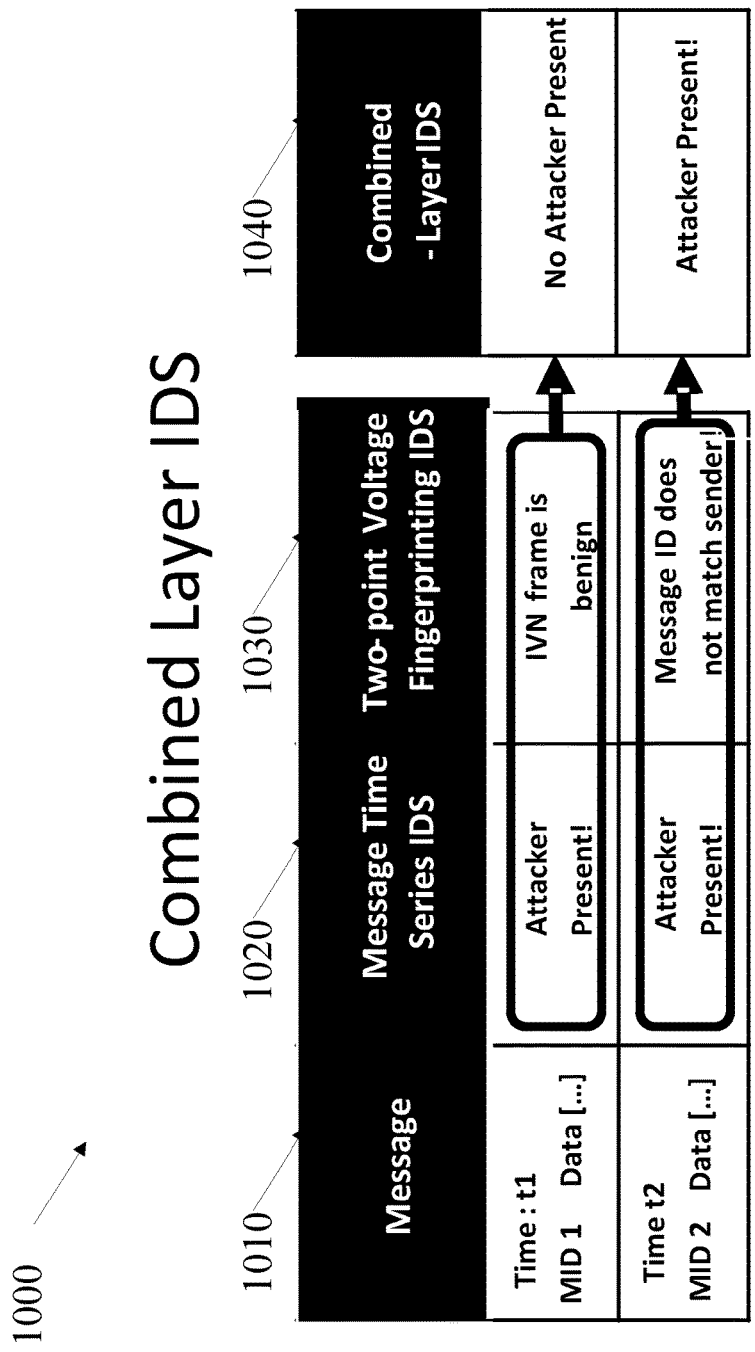
FIG. 10 depicts another embodiment of a combined layer IDS.

FIG. 10 depicts another embodiment 1000 of a combined layer IDS 1040. The embodiment 1000 illustrates the combined layer IDS 1040 in the form of a table of messages 1010 at time t1 and time t2, outputs from an MTS IDS 1020 at time t1 and time t2, outputs from a two-point voltage FP IDS 1030 at time t1 and time t2, and the combined outputs from the MTS IDS 1020 and the two-point voltage FP IDS 1030 by the combined layer IDS 1040 at time t1 and time t2.

At time t1, the in-vehicle network bus transmits a message with a first message ID, MID 1. The MTS IDS 1020 may determine that there is an attack on the in-vehicle network bus based on a comparison of a predicted message sequence on the bus and the observed message sequence based on a window of time of voltages on the bus. The two-point voltage FP IDS 1030 may determine that the message, or IVN frame, is benign and thus, the in-vehicle network bus is not being attacked. Thereafter, the combined layer IDS 1040 may combine the outputs from the MTS IDS 1020 and the two-point voltage FP IDS 1030 to determine that there is no attacker present on the bus.

At time t2, the in-vehicle network bus transmits a message with a second message ID, MID 2. The MTS IDS 1020 may determine that there is an attack on the in-vehicle network bus based on a comparison of a predicted message sequence on the bus and the observed message sequence based on a window of time of voltages on the bus. The two-point voltage FP IDS 1030 may determine that the message ID of the IVN frame does not match so suspicious activity is detected. Thereafter, the combined layer IDS 1040 may combine the outputs from the MTS IDS 1020 and the two-point voltage FP IDS 1030 to determine that there is an attacker present on the bus.

Figure 11:
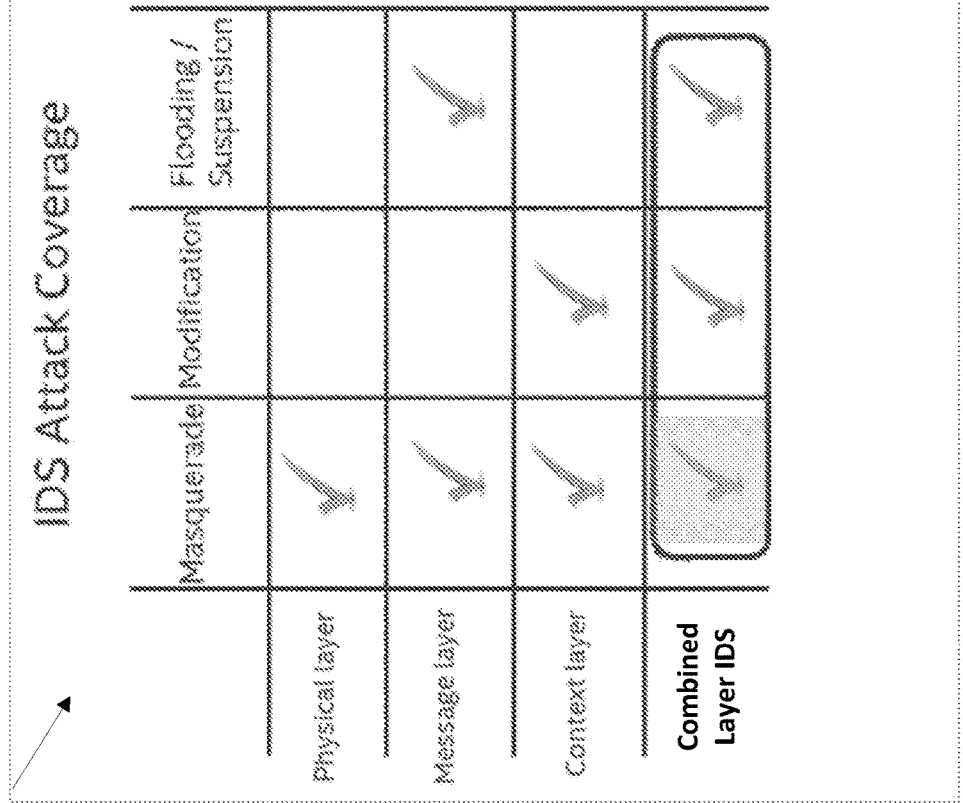
FIG. 11 depicts an embodiment of a chart of attack coverage by a combined layer IDS as compared with attack coverage by physical layer IDSs, message layer IDSs, and context layer IDSs.

FIG. 11 depicts an embodiment of a chart 1100 of attack coverage by a combined layer IDS as compared with attack coverage by physical layer IDSs, message layer IDSs, and context layer IDSs. The columns include masquerade attacks, modification attacks, and flooding/suspension attacks. The rows include a physical layer, a message layer, a context layer, and a combined layer IDS.

The masquerade column shows that the masquerade attacks can be detected at the physical layer, at the message layer, at the context layer, and with the combined layer IDS. The modification column shows that the modification attack can be detected at the context layer and by the combined layer IDS but cannot, in this example, be detected at the physical layer and the message layer. For instance, the modification attack may modify an amplitude of an acceleration value or a braking value by malicious code executing on a corresponding ECU. The IDSs on the physical layer may monitor and interpret the message transmitted from the ECU and that message may appear to be valid even if the acceleration value in the payload is larger or smaller than it should be based on input received by the ECU. The message layer may also have a problem detecting a modification attack that modifies a value of, e.g., acceleration in a payload of the message because the message layer IDSs may monitor sequences of messages from one or more ECUs and compare those against predicted sequences of messages without focus on the change in values in the payload.

The column for flooding/suspension attacks shows that the IDSs in the physical layer may not detect the flooding/suspension attacks, the message layer may detect the flooding/suspension attacks, the context layer may not detect the flooding/suspension attacks, and the combined layer IDS may detect the flooding/suspension attacks. Thus, the combined layer IDS advantageously detects a broader range of attacks with a high confidence as shown in FIG. 10 than the physical layer, message layer, and context layer IDSs. Furthermore, when combined with attack characterization logic circuitry such as the attack characterization logic circuitry 488 in FIG. 4, an attack characterization can, advantageously, be generated while receiving the outputs from the physical layer, message layer, and context layer IDSs.

Figure 12:
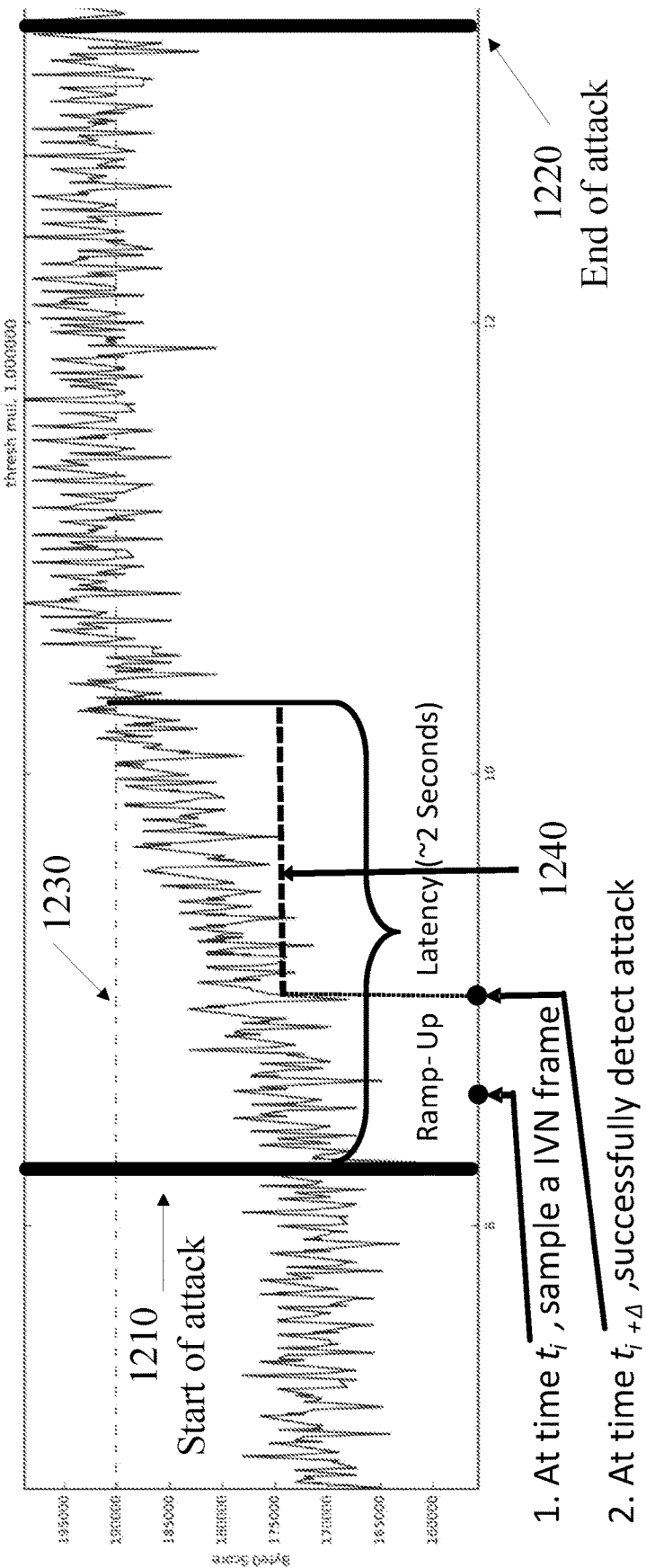
FIG. 12 depicts an embodiment of a voltage output for an in-vehicle network (IVN) frame from an ECU on the IVN bus captured by a message layer IDS and dynamic adjustment of a threshold level to reduce false negatives (FN)

FIG. 12 depicts an embodiment 1200 of a detection score based on multiple messages observed on a IVN bus captured by a message layer IDS and dynamic adjustment of a detection threshold level to reduce false negatives (FN). Time increases from left to right along the x-axis and the y-axis represents detection score based on the observed message patterns on a IVN bus. The start of an attack begins at line 1210 and the end of the attack is at line 1220. The malicious IVN frames are sent at time tj and the attack is successfully detected at time tj+$_\Delta$ based on detection of messages transmitted out of a predicted message sequence. By combining the message layer IDS with a physical layer IDS such as a voltage FP IDS, an inter-layer IDS could dynamically adjust the detection threshold level from the original or default detection threshold 1230 to a new detection threshold 1240 for detecting the attack and, as shown in the graph, advantageously reduce the latency of detection of the attack by the message layer IDS by approximately two seconds. Note that the duration of the latency is referred to as a false negative (FN) since it is possible to detect the attack during that time frame.

Figure 13:
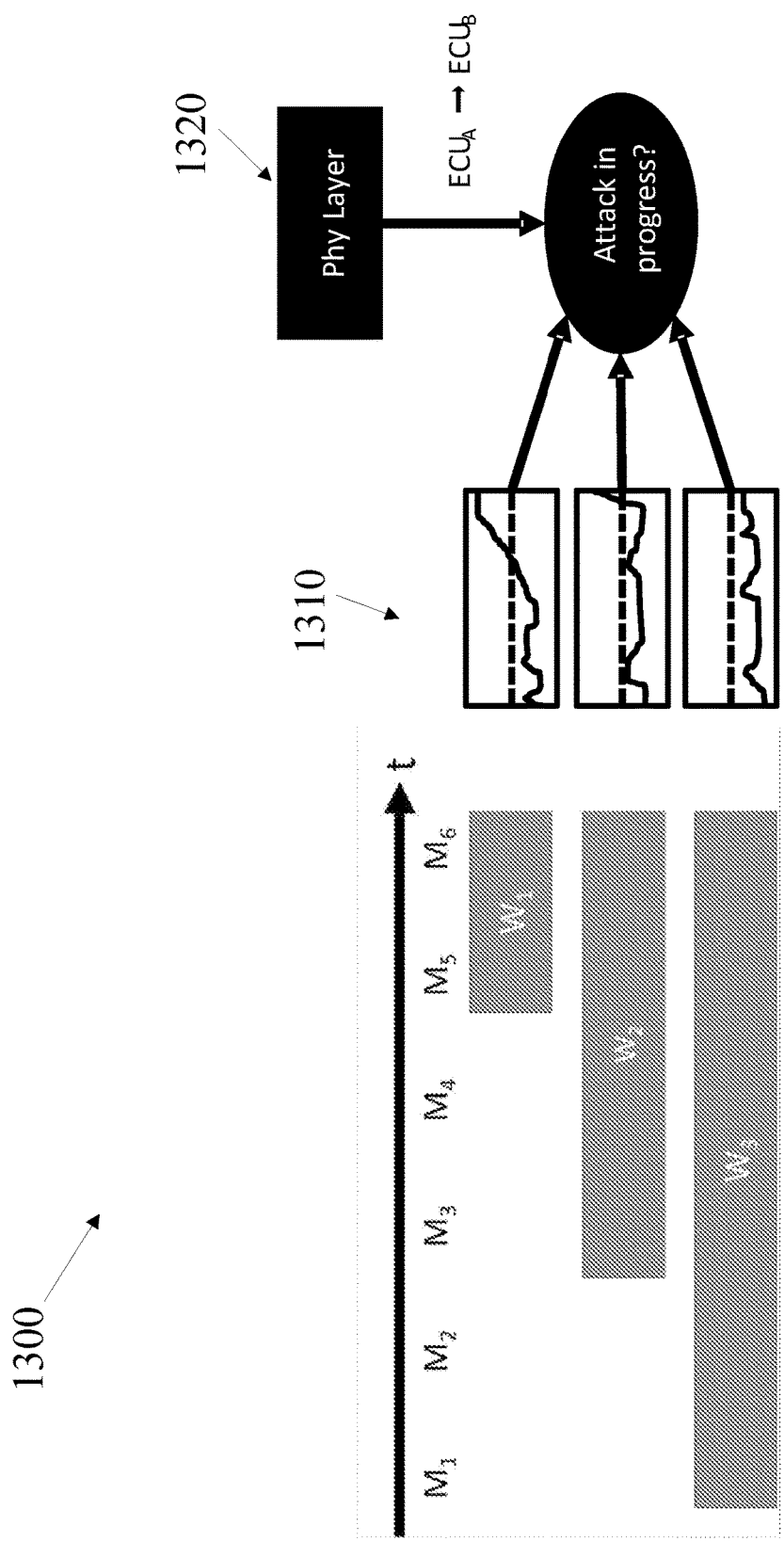
FIG. 13 depicts another embodiment of a combined layer IDS to combine outputs from three MTS IDSs with different size (time frame) windows with an output from a physical layer voltage FP.

FIG. 13 depicts another embodiment of a combined layer IDS 1300 to combine outputs from three MTS IDSs with different size (time frame) windows 1310 with an output from a physical layer voltage FP IDS 1320. A first MTS IDS may analyze a window, W1, including two messages, M5 and M6. A second MTS IDS may analyze a window, W2, including four messages, M3, M4, M5, and M6. A third MTS IDS may analyze a window, W3, including six messages, M1, M2, M3, M4, M5, and M6.

Figure 14:
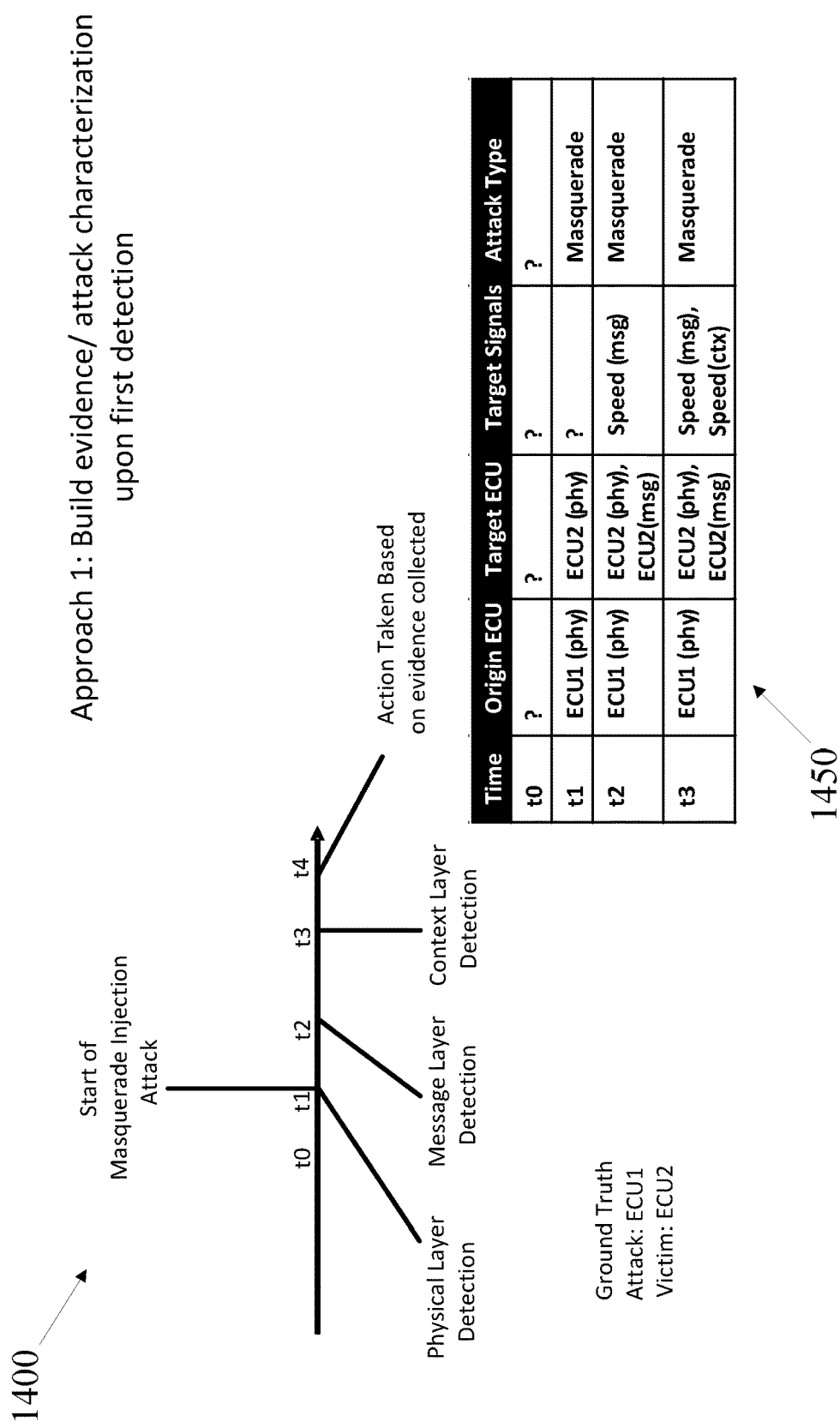
FIG. 14 depicts an embodiment of a timeline of a masquerade attack determined by a combined layer IDS along with observations determined by attack characterization logic circuitry.

FIG. 14 depicts an embodiment of a timeline 1400 of a masquerade attack determined by a combined layer IDS along with observations in an attack characterization 1450 determined by attack characterization logic circuitry such as the attack characterization logic circuitry 488 shown in FIG. 4. The timeline 1400 shows the start of the masquerade attack at time t1, detection of the attack at time t1 by a physical layer IDS, detection of the attack at time t2 by a message layer IDS, detection of the attack at time t3 by a context layer IDS, and action taken at time t4 to mitigate and/or recover from the attack.

The attack characterization logic circuitry may determine an attack characterization 1450 upon receipt of the outputs from the IDSs during the attack. At time t1, the physical layer IDS may output an indication of an intrusion or suspicious activity and the attack characterization logic circuitry may add evidence or characteristics of the attack to the attack characterization. In particular, the attack characterization logic circuitry may add at time t1 that the origin of the attack is ECU1 and the target of the attack is ECU2 based on detection of a message transmitted by the ECU1 with a message ID that identifies ECU2. Based on the attack including an invalid message ID, the attack characterization logic circuitry may add the attack type as masquerade.

At time t2, the message layer IDS may output an indication of an intrusion or suspicious activity and the attack characterization logic circuitry may add at time t2 that the origin of the attack is ECU1 based on detection by the physical layer IDS and the target of the attack is ECU2 based on detection by the physical layer IDS and by detection of a message with a message ID identifying ECU2 that deviates from the predicted sequence. Furthermore, the message layer IDS may identify the messages from the ECU2 as indicators of a speed and label the target signal as a speed signal. Based on the attack including an invalid message ID, the attack characterization logic circuitry may add the attack type as masquerade at t2.

At time t3, the context layer IDS may output an indication of an intrusion or suspicious activity and the attack characterization logic circuitry may add at time t3 that the origin of the attack is ECU1 based on detection by the physical layer IDS, the target of the attack is ECU2 based on detection by the physical layer IDS and by the message layer IDS, and that the target signal is the speed based on detection by the message layer IDS and based on detection of an anomalous speed by the context layer IDS. Furthermore, based on the attack including an invalid message ID, the attack characterization logic circuitry may add the attack type as masquerade at t3.

Figure 15:
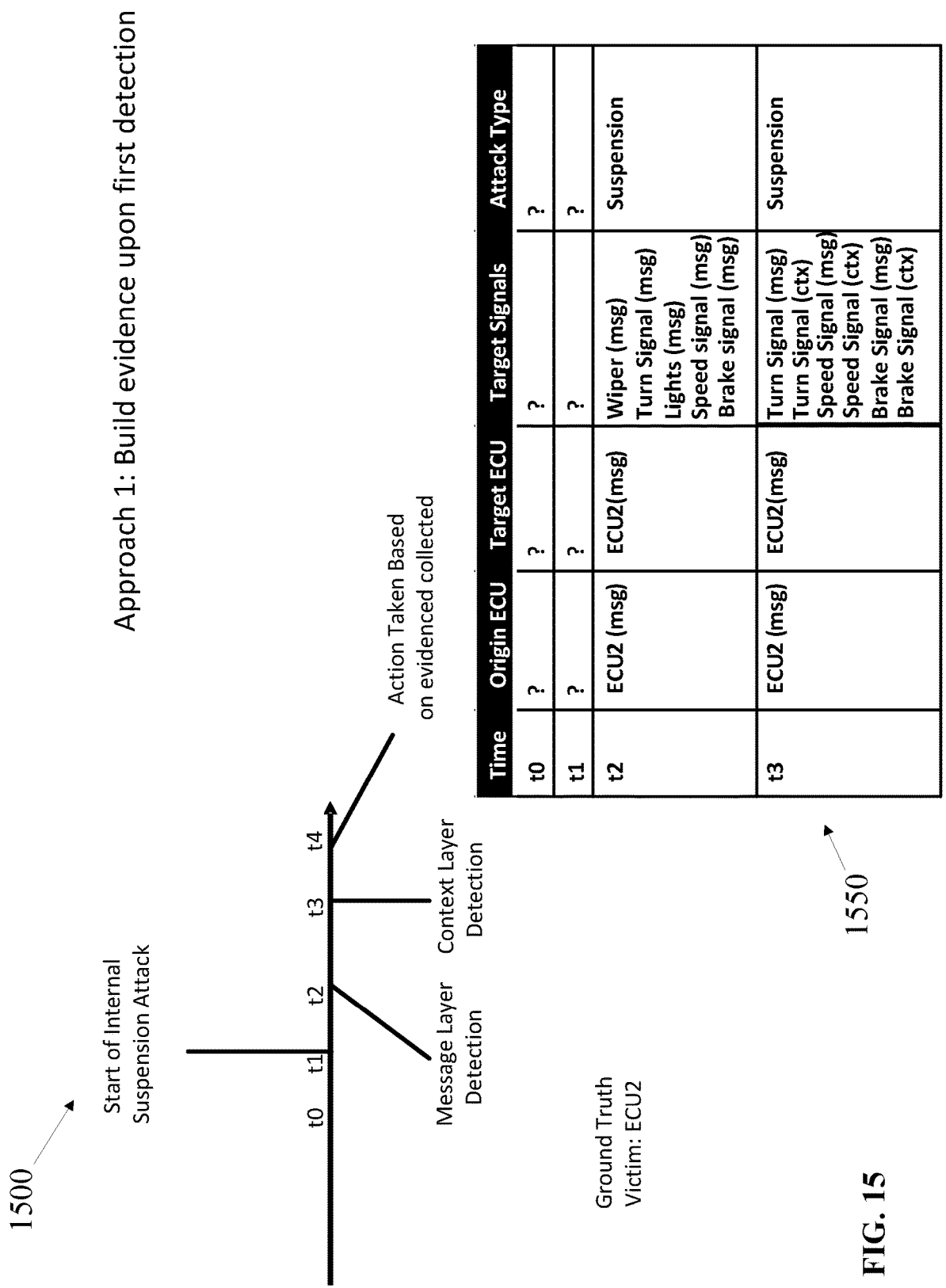
FIG. 15 depicts an embodiment of a timeline of a suspension attack determined by a combined layer IDS along with observations determined by attack characterization logic circuitry.

FIG. 15 depicts an embodiment of a timeline 1500 of a suspension attack determined by a combined layer IDS along with observations in an attack characterization 1550 determined by attack characterization logic circuitry such as the attack characterization logic circuitry 488 shown in FIG. 4. The timeline 1500 shows the start of the suspension attack at time t1, detection of the attack at time t2 by a message layer IDS, detection of the attack at time t3 by a context layer IDS, and action taken at time t4 to mitigate and/or recover from the attack.

The attack characterization logic circuitry may determine an attack characterization 1550 upon receipt of the outputs from the IDSs during the attack. At time t1, the physical layer IDS may not detect suspicious activity since the suspension attack suspends transmissions from the affected ECU(s).

At time t2, the message layer IDS may output an indication of an intrusion or suspicious activity and the attack characterization logic circuitry may add at time t2 that the origin of the attack is ECU2 and the target of the attack is ECU2 based on a lack of message transmissions by ECU2, which deviates from the predicted sequence. Furthermore, the message layer IDS may identify the messages from the ECU2 as indicators for a wiper, a turn signal, lights, speed signal, and brake signal, and label the target signal as the wiper, turn signal, lights, speed signal, and brake signal. Based on the attack including suspension of transmissions by ECU2, the attack characterization logic circuitry may add the attack type as suspension at t2.

At time t3, the context layer IDS may output an indication of an intrusion or suspicious activity and the attack characterization logic circuitry may add at time t3 that the origin of the attack is ECU2 and the target of the attack is ECU2 based on detection by the message layer IDS, and that the target signals are the turn signal, brake signal, and speed signal based on detection by the message layer IDS and based on detection by the context layer IDS of a lack of a turn signal, lack of a speed signal, and lack of a brake signal while the vehicle is making a turn. Furthermore, based on the attack suspending messages from the ECU2, the attack characterization logic circuitry may add the attack type as suspension at t3.

Figure 16:
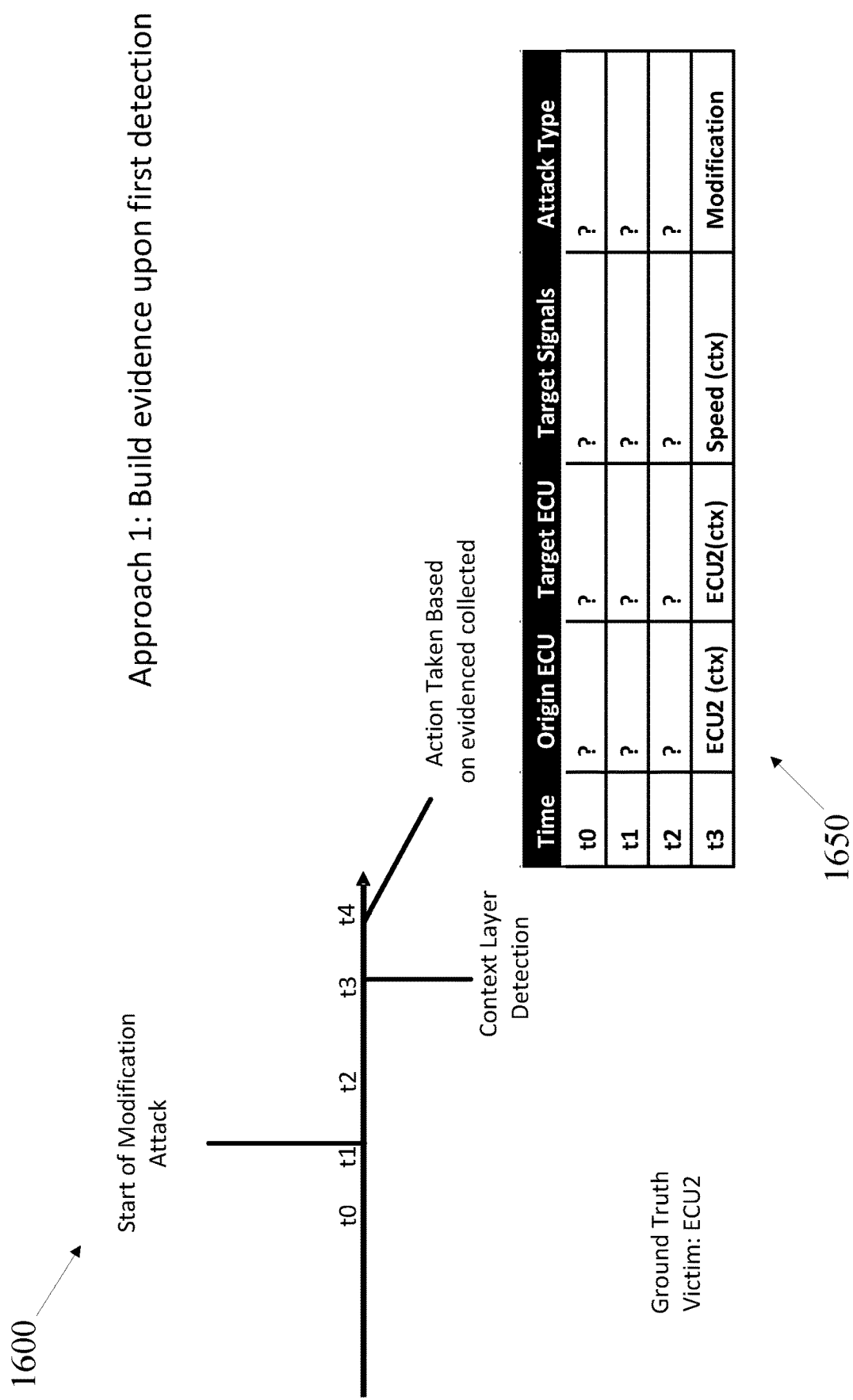
FIG. 16 depicts an embodiment of a timeline of a modification attack determined by a combined layer IDS along with observations determined by attack characterization logic circuitry.

FIG. 16 depicts an embodiment of a timeline 1600 of a modification attack determined by a combined layer IDS along with observations in an attack characterization 1650 determined by attack characterization logic circuitry such as the attack characterization logic circuitry 488 shown in FIG. 4. The timeline 1600 shows the start of the suspension attack at time t1, detection of the attack at time t3 by a context layer IDS and action taken at time t4 to mitigate and/or recover from the attack.

The attack characterization logic circuitry may determine an attack characterization 1650 upon receipt of the outputs from the IDSs during the attack. At times t1 and t2, the physical layer IDS and message layer IDSs may not detect suspicious activity since the modification attack may make a modification to a payload of a message that is not detectable at the physical and message layers.

At time t3, the context layer IDS may output an indication of an intrusion or suspicious activity and the attack characterization logic circuitry may add at time t3 that the origin of the attack is ECU2 and the target of the attack is ECU2 based on detection by the context layer IDS that the speed indicated in the message with the message ID of ECU2 has changed too much since the last message transmission of the speed. For instance, the context layer IDS may determine that the change in the speed is not possible and/or not likely based on physics of the vehicle. Furthermore, based on the attack modifying the speed in the message from the ECU2, the attack characterization logic circuitry may add the attack type as modification at t3.

Figure 17:
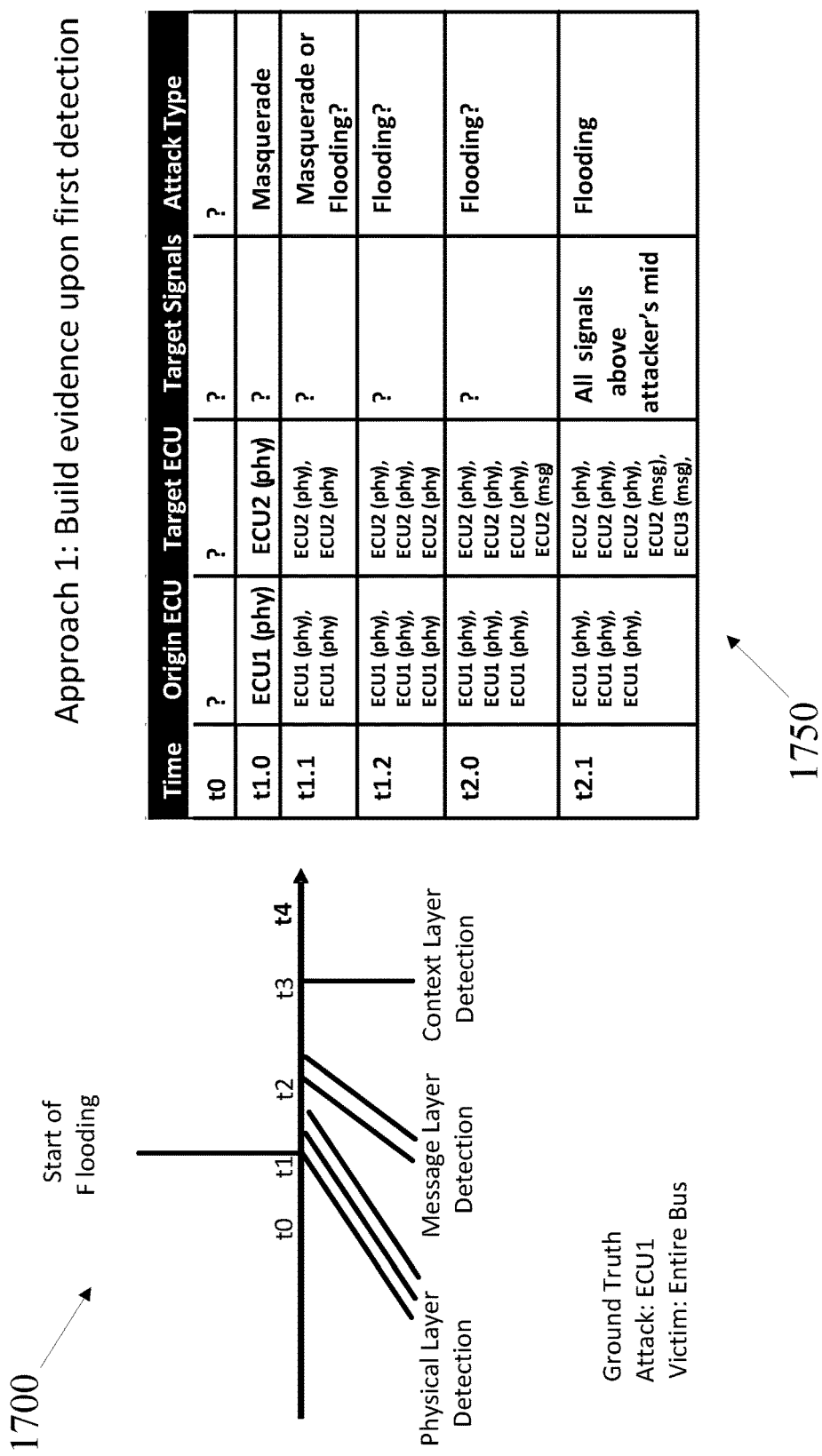
FIG. 17 depicts an embodiment of a timeline of a flooding attack determined by a combined layer IDS along with observations determined by attack characterization logic circuitry.

FIG. 17 depicts an embodiment of a timeline 1700 of a flooding attack determined by a combined layer IDS along with observations in an attack characterization 1750 determined by attack characterization logic circuitry such as the attack characterization logic circuitry 488 shown in FIG. 4. The timeline 1700 shows the start of the flooding attack at time t1.0, detection of the attack at times t1.0, t1.1, and t1.2 by a physical layer IDS and detection of the attack at times t2.0 and 2.1 by a message layer IDS.

The attack characterization logic circuitry may determine an attack characterization 1450 upon receipt of the outputs from the IDSs during the attack. At time t1.0, the physical layer IDS may output an indication of an intrusion or suspicious activity and the attack characterization logic circuitry may add at time t1.0 that the origin of the attack is ECU1 and the target of the attack is ECU2 based on detection of a message transmitted by the ECU1 with a message ID that identifies ECU2. Based on the attack including an invalid message ID, the attack characterization logic circuitry may add the attack type as masquerade.

At time t1.1, the physical layer IDS may output an indication of an intrusion or suspicious activity and the attack characterization logic circuitry may add at time t1.1 that the origin of the attack is ECU1 and the target of the attack is ECU2. Based on the attack including an invalid message ID and the repeated attack before the next predicted transmission of a message by ECU1, the attack characterization logic circuitry may add the attack type as masquerade or flooding.

At time t1.2, the physical layer IDS may output an indication of an intrusion or suspicious activity and the attack characterization logic circuitry may add at time t1.2 that the origin of the attack is ECU1 and the target of the attack is ECU2. Based on the attack being repeated again before the next predicted transmission of a message by ECU1, the attack characterization logic circuitry may add the attack type as flooding.

At time t2.0, the message layer IDS may output an indication of an intrusion or suspicious activity and the attack characterization logic circuitry may add at time t2.0 that the origin of the attack is ECU1 based on detection by the physical layer IDS and the target of the attack is ECU2 based on detection by the physical layer IDS and the message layer IDS based on detection of multiple messages from the ECU2 that deviate from the predicted message sequence. Based on the attack including multiple messages from the ECU2 added to the predicted sequence, the attack characterization logic circuitry may add the attack type as flooding at t2.0.

At time t2.1, the message layer IDS may output an indication of an intrusion or suspicious activity and the attack characterization logic circuitry may add at time t2.1 that the origin of the attack is ECU1 based on detection by the physical layer IDS and the target of the attack is ECU2 based on detection by the physical layer IDS and the message layer IDS based on detection of multiple messages from the ECU2 that deviate from the predicted message sequence. Based on the attack including multiple messages from the ECU2 added to the predicted sequence, the attack characterization logic circuitry may add the attack type as flooding at t2.1 and the target signals are all signals transmitted via the in-vehicle network bus.

Figure 18:
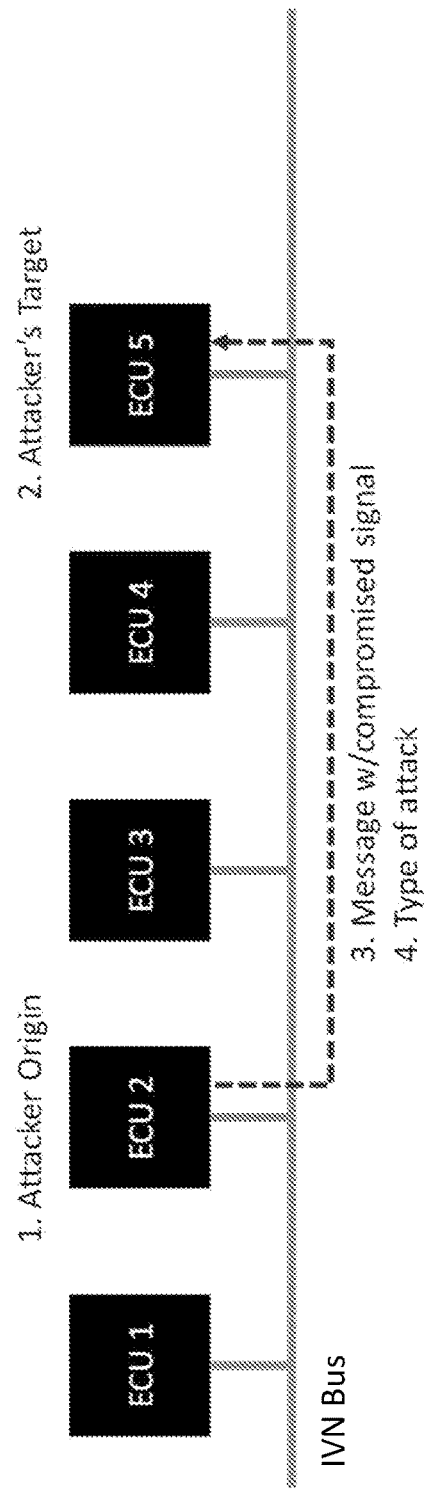
FIG. 18 depicts an embodiment of attacker origin and attacker target ECUs.

FIG. 18 depicts an embodiment 1800 of a IVN bus with five ECUs including an attacker origin and attacker target ECUs. The ECUs may comprise circuitry such as the ECU 404 shown in FIG. 4 and may each perform a vehicle function such as determining a speed from a sensor, determining an acceleration from a sensor, determining an adjustment to a speed based on a user input, determining a braking action based on the user input, and/or the like. In the present embodiment, ECU 2 is compromised and becomes the attacker origin. The ECU 2 may be compromised by execution of malicious code and the malicious code may cause the ECU 2 to output a message with a compromised signal such as a message ID for ECU 5; a modified payload indicative of a speed, acceleration, braking action; or the like. The ECU 5 is the target of the attack because ECU 5 may lose full control over the output messages showing ECU 5's message ID. As a result, the ECU 2 may affect changes to, e.g., speed, as indicated on a speedometer display. For instance, the speedometer may display the speed provided by the malicious code rather than the speed from the ECU 5 for at least part of the time, confusing or misleading a driver of the vehicle.

As an alternative example, the malicious code executing on ECU 2 may modify a payload of the message transmitted by ECU 2 from a payload calculated based on sensor input to a different value determined by the malicious code. The payload may provide, e.g., a speed to the ECU 5 so that ECU 5 can update the speedometer display. ECU 5 is the target of the attacker in this example also because ECU 5's output messages are affected by the incorrect input provided by the malicious code executing on the ECU 2.

FIGS. 19A-B depict embodiments of flowcharts to detect intrusions and characterize attacks based on the intrusions. FIG. 19A shows the flowchart 1900 for combining outputs from intrusion detectors and/or IDSs. The flowchart 1900 begins with monitoring one or more observation layers of an in-vehicle network, each of the one or more control units to perform a vehicle function (element 1905). Detection logic circuitry of a combined layer IDS such as the detection logic circuitry 480 in FIG. 4 may monitor intrusion detectors that may be integrated with ECUs or other control units as well as one or more different observation layer IDSs such as physical layer IDSs, message layer IDSs, context layer IDSs, other layer IDSs, and/or any combination thereof. Furthermore, the detection logic circuitry may pass information about detections of suspicious activity or intrusions to attack characterization logic circuitry at element 1955 described in FIG. 19B.

After receiving outputs from each of the intrusion detectors and/or IDSs that the detection logic circuitry is configured to combine, the detection logic circuitry may combine observations of the one or more control units at the one or more observation layers (element 1910). The detection logic circuitry may combine the observations via one or more of various different ways. For instance, the observations may be combined based on historical training of models to combine the observations. The models may be mathematical, statistical, neural networks, or other machine learning models that may learn parameters for combination of the observations based on training the models with historical data relevant to identifying one or more different attacks on in-vehicle systems. In such embodiments, for example, observations at different layers may be assigned different weights for the combination.

As another example, the detection logic circuitry may combine the observations via majority voting, weighted voting, and/or may selectively filter observations based on historical training of the source of the observations. For instance, if a source of an observation was not recently trained, the model may either weight the output based on a determined validity of the training in relation to sources of other observations or may not consider observations from sources with outdated training.

Once the observations are combined, the detection logic circuitry may determine, based on a combination of the observations, that one or more of the observations represent an intrusion (element 1915). In other words, the detection logic circuitry may determine whether the in-vehicle system or sub-system is being attacked based on the output from the combination by comparing the output from the combination with a detection threshold. The detection logic circuitry may determine that an attack is occurring if the output from the combination meets or exceeds the detection threshold.

After determining that the combination of the observations represents an intrusion, the detection logic circuitry may output a message indicating that the intrusion/attack (element 1920). In some embodiments, the message indicating the attack is passed to an attack characteristic logic circuitry.

FIG. 19B shows the flowchart 1950 for characterizing attacks based on observations about the intrusions/attacks. The flowchart 1950 begins with determining origin(s) of the attack, based on input from one or more IDSs (element 1905). Attack characterization logic circuitry such as the attack characterization logic circuitry 488 in FIG. 4 may determine the origins of an attack based on the source ID or message ID of the first message determined to be suspicious activity or an intrusion. For instance, if the first message includes an invalid message ID, a physical layer IDS may determine that the message is an intrusion and the ECU(s) or other control units associated with such message(s) may be the origin of the attack. The origin of the attack may likely be the ECU or other control unit that is affected by malicious code.

After determining the origin of the attack, the attack characterization logic circuitry may determine the victim(s) or target(s) of the attack (element 1960). The victim(s) or target(s) of the attack are the ECUs that are, e.g., being impersonated by messages affected by the malicious code or that consume messages from the malicious code to produce erroneous messages. For masquerading attacks, the invalid message ID from the attack origin is a message ID of the victim or the target of the attack.

The attack characterization logic circuitry may also determine one or more signals compromised by the attack (element 1965). In the masquerade attack, the target of the attack may output a signal such as a speed, acceleration, braking, turning, and/or other signal. The signal(s) affected by the message(s) generated with the malicious code are the signals compromised by the attack.

The attack characterization logic circuitry may also determine the type of the attack and the deviation or frequency of the attack (element 1970). The type or nature of the attack may be determined at one or more observation layers. For instance, the masquerade attack may be first detected at the physical layer and then the message and context layers based on an invalid message ID from a source of the attack, an incorrect message sequence, and an incorrect context of the message, respectively. Flooding and suspension attacks, on the other hand, may not be detected by the physical layer but may be detected at the message layer and the context layer based a lack of communication from a control unit such as an ECU or excessive messages transmitted from the control unit. Furthermore, a modification attack may not be detectable by the physical and message layers but may be detectable by the context layer that recognizes erroneous outputs by a control unit.

The attack characterization logic circuitry may, advantageously, gather information to characterize the attack during the attack to generate an attack characterization such as the attack characterizations 1450, 1550, 1650, and 1750 shown in FIGS. 14-17, respectively. The attack characterization logic circuitry may pass the attack characterization to a forensic logging and/or recovery system (element 1985) if the observations are determined to be an attack (element 1980). Otherwise (element 1980) the attack characterization logic circuitry may continue to generate further attack characterizations at element 1955.

Figure 20:
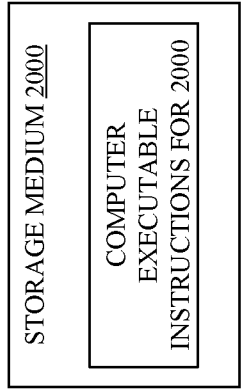
FIGS. 20-21 depict embodiments of a storage medium to store code to detect intrusions and characterizes attacks based on the intrusions.

FIG. 20 illustrates an example of a storage medium 2000 to store processor data structures. Storage medium 2000 may comprise an article of manufacture. In some examples, storage medium 2000 may include any non-transitory computer readable medium or machine-readable medium, such as an optical, magnetic or semiconductor storage. Storage medium 2000 may store various types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 21:
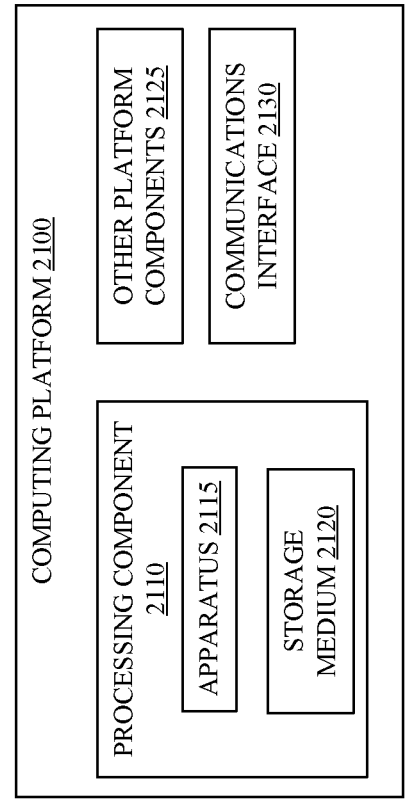

FIG. 21 illustrates an example computing platform 2100. In some examples, as shown in FIG. 21, computing platform 2100 may include a processing component 2110, other platform components or a communications interface 2130. According to some examples, computing platform 2100 may be implemented in a computing device such as a server in a system such as a data center or server farm that supports a manager or controller for managing configurable computing resources as mentioned above. Furthermore, the communications interface 2130 may comprise a wake-up radio (WUR) and may be capable of waking up a main radio of the computing platform 2100.

According to some examples, processing component 2110 may execute processing operations or logic for apparatus 2115 described herein. Processing component 2110 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 2120, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 2125 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 2130 may include logic and/or features to support a communication interface. For these examples, communications interface 2130 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 2100 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 2100 described herein, may be included or omitted in various embodiments of computing platform 2100, as suitably desired.

The components and features of computing platform 2100 may be implemented using any combination of discrete circuitry, ASICs, logic gates and/or single chip architectures. Further, the features of computing platform 2100 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the exemplary computing platform 2100 shown in the block diagram of FIG. 21 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code to execute on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and may include processing circuitry to process the signals to generate the at least one output. While executing code, the code changes the physical states and characteristics of transistors that make up a processor pipeline and/or registers. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

Several embodiments have one or more potentially advantages effects. For instance, implementing a combined layer IDS advantageously enables detection of a relatively broad range of attacks as well as enables detection of attacks with high confidence. Implementing a combined layer IDS advantageously enables detection of suspension attacks and masquerade attacks with improved confidence. Implementing a combined layer IDS advantageously facilitates tailoring detection systems to accomplish low latency detection and high confidence in attack characterization. Implementing attack characterization logic circuitry advantageously enables detection of attacks with less latency based on dynamic adjustment of detection thresholds. Implementing attack characterization logic circuitry advantageously enables avoidance or attenuation of generation of false positive detections of suspicious activity. Implementing attack characterization logic circuitry advantageously enables avoidance or attenuation of false negative detections of suspicious activity. Implementing attack characterization logic circuitry advantageously enables creation of an attack characterization during an attack based on observations made to detect the attack. Implementing attack characterization logic circuitry advantageously enables provision of more detailed information to a forensic logging and/or recovery system to log the attack/anomaly and/or to facilitate a refined or tailored recovery procedure.

EXAMPLES OF FURTHER EMBODIMENTS

The following examples pertain to further embodiments. Specifics in the examples may be used anywhere in one or more embodiments.

Example 1 is an apparatus to detect intrusion, the apparatus comprising: memory; and a detection logic circuitry to monitor one or more control units at one or more observation layers of an in-vehicle network, each of the one or more control units to perform a vehicle function; to combine observations of the one or more control units at the one or more observation layers; and to determine, based on a combination of the observations, that one or more of the observations represent an intrusion. In example 2, the apparatus of Example 1, further comprising attack characterization logic circuitry to determine, based at least on the observations, characteristics of an attack, and to pass the characteristics of the attack information to a forensic logging system to log the attack or pass the characteristics of the attack to a recovery system for informed selection of recovery procedures. In example 3, the apparatus of Example 2, the characteristics to comprise an indication of the one or more of the observations that represent the attack. In example 4, the apparatus of Example 3, the characteristics to comprise an indication of compromised signals. In example 5, the apparatus of Example 2, the characteristics to comprise an indication of one or more of the control units that represent a source of the attack. In example 6, the apparatus of Example 2, the characteristics to comprise an indication of one or more of the control units that represent a target for the attack. In example 7, the apparatus of Example 1, wherein the detection logic circuitry comprises a processor coupled with the memory to execute code of the detection logic circuitry. In example 8, the apparatus of Example 1, the detection logic circuitry to comprise dynamic threshold logic circuitry to dynamically adjust a threshold for detection of suspicious activity by an IDS at a first layer based on an output from an IDS at a second layer. In example 9, the apparatus of Example 1, the detection logic circuitry to comprise dynamic threshold logic circuitry to dynamically adjust a threshold for detection of suspicious activity by an IDS at a first layer based on a single output or a combination of outputs from at least one other IDS. In example 10, the apparatus of Example 1, wherein the observation layers to include any one or more layers of a physical layer, a message layer, a context layer, and an other layer, wherein the physical layer comprises voltage levels at pins of a control unit, the message layer comprises voltages on channels of an in-vehicle bus, the context layer comprises vehicle specific messages, and the other layer comprises other vehicle data. In example 11, the apparatus of Example 1, wherein combination of the observations of the one or more control units at the one or more observation layers comprises any one or combination of intra-layer observation combinations, inter-layer combinations, and global layer combinations. In example 12, the apparatus of Example 1, wherein combination of the observations of the one or more control units at the one or more observation layers comprises any one or combination of majority voting, machine learning, weighted voting, and historical pattern comparison.

Example 13 is a method to detect intrusion, the method comprising: monitoring, by a detection logic circuitry, one or more control units at one or more observation layers of an in-vehicle network, each of the one or more control units to perform a vehicle function; combining observations of the one or more control units at the one or more observation layers; and determining, based on a combination of the observations, that one or more of the observations represent an intrusion. In example 14, the method of Example 13, further comprising determining, based at least on the observations, characteristics of an attack, and to pass the characteristics of the attack information to a forensic logging system to log the attack or pass the characteristics of the attack to a recovery system for informed selection of recovery procedures. In example 15, the method of Example 14, the characteristics to comprise an indication of the one or more of the observations that represent the attack. In example 16, the method of Example 14, the characteristics to comprise an indication of compromised signals. In example 17, the method of Example 14, the characteristics to comprise an indication of one or more of the control units that represent a source of the attack. In example 18, the method of Example 13, further comprising dynamically adjusting a threshold for detection of suspicious activity by an IDS at a first layer based on an output from an IDS at a second layer. In example 19, the method of Example 13, further comprising to dynamically adjusting a threshold for detection of suspicious activity by an IDS at a first layer based on a single output or a combination of outputs from at least one other IDS. In example 20, the method of Example 13, wherein the observation layers to include any one or more layers of a physical layer, a message layer, a context layer, and an other layer, wherein the physical layer comprises voltage levels at pins of a control unit, the message layer comprises message ordering/timing and content contained within the messages observed on channels of an in-vehicle bus, the context layer comprises vehicle specific messages or signals within the specified messages, and the other layer comprises other vehicle data. In example 21, the method of Example 13, wherein combination of the observations of the one or more control units at the one or more observation layers comprises any one or combination of intra-layer observation combinations, inter-layer combinations, and global layer combinations. In example 22, the method of Example 13, wherein combination of the observations of the one or more control units at the one or more observation layers comprises any one or combination of majority voting, machine learning, weighted voting, and historical pattern comparison.

Example 19 is a computer program product comprising a non-transitory computer-readable medium, comprising instructions, which when executed by a processor cause the processor to perform operations, the operations to: monitor one or more control units at one or more observation layers of an in-vehicle network, each of the one or more control units to perform a vehicle function; combine observations of the one or more control units at the one or more observation layers; and determine, based on a combination of the observations, that one or more of the observations represent an intrusion. In example 20, the computer program product of Example 19, wherein the operations further comprise operations to determine based at least on the observations, characteristics of an attack, and to pass the characteristics of the attack information to a forensic logging system to log the attack or pass the characteristics of the attack to a recovery system for informed selection of recovery procedures. In example 21, the computer program product of Example 20, the characteristics to comprise an indication of the one or more of the observations that represent the attack and an indication of compromised signals. In example 22, the computer program product of Example 20, the characteristics to comprise an indication of one or more of the control units that represent a source of the attack. In example 23, the computer program product of Example 20, further comprising operations to dynamically adjust a threshold for detection of suspicious activity by an IDS at a first layer based on an output from an IDS at a second layer. In example 24, the computer program product of Example 20, further comprising operations to dynamically adjust a threshold for detection of suspicious activity by an IDS at a first layer based on a single output or a combination of outputs from at least one other IDS. In example 25, the computer program product of Example 18, wherein combination of the observations of the one or more control units at the one or more observation layers comprises any one or combination of intra-layer observation combinations, inter-layer combinations, and global layer combinations.

Example 25 is an apparatus to detect intrusion, the apparatus comprising: a means for monitoring one or more control units at one or more observation layers of an in-vehicle network, each of the one or more control units to perform a vehicle function; a means for combining observations of the one or more control units at the one or more observation layers; and a means for determining, based on a combination of the observations, that one or more of the observations represent an intrusion. In example 26, the apparatus of Example 25, further comprising a means for determining, based at least on the observations, characteristics of an attack, and to pass the characteristics of the attack information to a forensic logging system to log the attack or pass the characteristics of the attack to a recovery system for informed selection of recovery procedures. In example 27, the apparatus of Example 26, the characteristics to comprise an indication of the one or more of the observations that represent the attack. In example 28, the apparatus of Example 26, the characteristics to comprise an indication of compromised signals. In example 29, the apparatus of Example 26, the characteristics to comprise an indication of one or more of the control units that represent a source of the attack. In example 30, the apparatus of Example 25, further comprising a means for dynamically adjusting a threshold for detection of suspicious activity by an IDS at a first layer based on an output from an IDS at a second layer. In example 31, the apparatus of Example 25, further comprising a means for dynamically adjusting a threshold for detection of suspicious activity by an IDS at a first layer based on a single output or a combination of outputs from at least one other IDS. In example 32, the apparatus of Example 25, wherein the observation layers to include any one or more layers of a physical layer, a message layer, a context layer, and an other layer, wherein the physical layer comprises voltage levels at pins of a control unit, the message layer comprises message ordering/timing and content contained within the messages observed on channels of an in-vehicle bus, the context layer comprises vehicle specific messages or signals within the specified messages, and the other layer comprises other vehicle data. In example 33, the apparatus of Example 25, wherein combination of the observations of the one or more control units at the one or more observation layers comprises any one or combination of intra-layer observation combinations, inter-layer combinations, and global layer combinations. In example 34, the apparatus of Example 25, wherein combination of the observations of the one or more control units at the one or more observation layers comprises any one or combination of majority voting, machine learning, weighted voting, and historical pattern comparison.

Example 35 is an system to detect intrusion, the system comprising: memory comprising flash memory and random access memory; and a detection logic circuitry to monitor one or more control units at one or more observation layers of an in-vehicle network, each of the one or more control units to perform a vehicle function; to combine observations of the one or more control units at the one or more observation layers; and to determine, based on a combination of the observations, that one or more of the observations represent an intrusion. In example 36, the system of Example 35, further comprising attack characterization logic circuitry to determine, based at least on the observations, characteristics of an attack, and to pass the characteristics of the attack information to a forensic logging system to log the attack or pass the characteristics of the attack to a recovery system for informed selection of recovery procedures. In example 37, the system of Example 36, the characteristics to comprise an indication of the one or more of the observations that represent the attack. In example 38, the system of Example 37, the characteristics to comprise an indication of compromised signals. In example 39, the system of Example 36, the characteristics to comprise an indication of one or more of the control units that represent a source of the attack. In example 40, the system of Example 36, the characteristics to comprise an indication of one or more of the control units that represent a target for the attack. In example 41, the system of Example 35, wherein the detection logic circuitry comprises a processor coupled with the memory to execute code of the detection logic circuitry. In example 42, the system of Example 35, the detection logic circuitry to comprise dynamic threshold logic circuitry to dynamically adjust a threshold for detection of suspicious activity by an IDS at a first layer based on an output from an IDS at a second layer. In example 43, the system of Example 35, the detection logic circuitry to comprise dynamic threshold logic circuitry to dynamically adjust a threshold for detection of suspicious activity by an IDS at a first layer based on a single output or a combination of outputs from at least one other IDS. In example 44, the system of Example 35, wherein the observation layers to include any one or more layers of a physical layer, a message layer, a context layer, and an other layer, wherein the physical layer comprises voltage levels at pins of a control unit, the message layer comprises voltages on channels of an in-vehicle bus, the context layer comprises vehicle specific messages, and the other layer comprises other vehicle data. In example 45, the system of Example 35, wherein combination of the observations of the one or more control units at the one or more observation layers comprises any one or combination of intra-layer observation combinations, inter-layer combinations, and global layer combinations. In example 46, the system of Example 35, wherein combination of the observations of the one or more control units at the one or more observation layers comprises any one or combination of majority voting, machine learning, weighted voting, and historical pattern comparison.

What is claimed is:

1. An apparatus to detect intrusion, the apparatus comprising:
    memory; and
    a detection logic circuitry arranged to:
        monitor one or more control units at two or more observation layers of an in-vehicle network, each of the one or more control units to perform a vehicle function, the two or more observation layers to comprise two or more of a physical layer, a message layer, a context layer or a vehicle-to-everything (V2X) layer;
        combine observations of the one or more control units at the two or more observation layers; and
        determine, based on a combination of the observations and a threshold for detection of suspicious activity, that one or more of the observations represent an intrusion.

2. The apparatus of claim 1, further comprising attack characterization logic circuitry to determine, based at least on the observations, characteristics of an attack, and to pass the characteristics of the attack information to a forensic logging system to log the attack or pass the characteristics of the attack to a recovery system for informed selection of recovery procedures.

3. The apparatus of claim 2, the characteristics to comprise an indication of the one or more of the observations that represent the attack.

4. The apparatus of claim 3, the characteristics to comprise an indication of compromised signals.

5. The apparatus of claim 2, the characteristics to comprise an indication of one or more of the control units that represent a source of the attack.

6. The apparatus of claim 2, the characteristics to comprise an indication of one or more of the control units that represent a target for the attack.

7. The apparatus of claim 1, wherein the detection logic circuitry comprises a processor coupled with the memory to execute code of the detection logic circuitry.

8. The apparatus of claim 1, the detection logic circuitry to comprise dynamic threshold logic circuitry to dynamically adjust the threshold for detection of suspicious activity by an IDS at a first layer based on an output from an IDS at a second layer.

9. The apparatus of claim 1, the detection logic circuitry to comprise dynamic threshold logic circuitry to dynamically adjust the threshold for detection of suspicious activity by an IDS at a first layer based on a single output or a combination of outputs from at least one other IDS.

10. The apparatus of claim 1, wherein the physical layer comprises voltage levels at pins of a control unit, the message layer comprises message ordering/timing and content contained within the messages observed on channels of an in-vehicle bus, the context layer comprises vehicle specific messages, and the V2X layer comprises external communications.

11. The apparatus of claim 1, wherein combination of the observations of the one or more control units at the one or more observation layers comprises any one or combination of intra-layer observation combinations, inter-layer combinations, and global layer combinations.

12. The apparatus of claim 1, wherein combination of the observations of the one or more control units at the one or more observation layers comprises any one or combination of majority voting, machine learning, weighted voting, and historical pattern comparison.

13. A method to detect intrusion, the method comprising:
    monitoring, by a detection logic circuitry, one or more control units at two or more observation layers of an in-vehicle network, each of the one or more control units to perform a vehicle function, the two or more observation layers to comprise two or more of a physical layer, a message layer, a context layer or a vehicle-to-everything (V2X) layer;
    combining observations of the one or more control units at the two or more observation layers; and
    determining, based on a combination of the observations and a threshold for detection of suspicious activity, that one or more of the observations represent an intrusion.

14. The method of claim 13, further comprising determining, based at least on the observations, characteristics of an attack, and to pass the characteristics of the attack information to a forensic logging system to log the attack or pass the characteristics of the attack to a recovery system for informed selection of recovery procedures.

15. The method of claim 14, the characteristics to comprise an indication of the one or more of the observations that represent the attack.

16. The method of claim 14, the characteristics to comprise an indication of compromised signals and an indication of one or more of the control units that represent a source of the attack.

17. The method of claim 13, further comprising dynamically adjusting the threshold for detection of suspicious activity by an IDS at a first layer based on an output from an IDS at a second layer.

18. The method of claim 13, further comprising to dynamically adjusting the threshold for detection of suspicious activity by an IDS at a first layer based on a single output or a combination of outputs from at least one other IDS.

19. A computer program product comprising a non-transitory computer-readable medium, comprising instructions, which when executed by a processor cause the processor to perform operations, the operations to:

monitor one or more control units at two or more observation layers of an in-vehicle network, each of the one or more control units to perform a vehicle function, the two or more observation layers to comprise two or more of a physical layer, a message layer, a context layer or a vehicle-to-everything (V2X) layer;

combine observations of the one or more control units at the two or more observation layers; and determine, based on a combination of the observations and a threshold for detection of suspicious activity, that one or more of the observations represent an intrusion.

20. The computer program product of claim 19, wherein the operations further comprise operations to determine based at least on the observations, characteristics of an attack, and to pass the characteristics of the attack information to a forensic logging system to log the attack or pass the characteristics of the attack to a recovery system for informed selection of recovery procedures.

\* \* \* \* \*